(12) United States Patent
Chun

(10) Patent No.: US 11,553,332 B2
(45) Date of Patent: Jan. 10, 2023

(54) METHOD AND DEVICE FOR CONTROLLING DATA TRANSMISSION STATE IN WIRELESS COMMUNICATION SYSTEM

(71) Applicant: LG ELECTRONICS INC., Seoul (KR)

(72) Inventor: Sungduck Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 37 days.

(21) Appl. No.: 17/262,632

(22) PCT Filed: Jul. 22, 2019

(86) PCT No.: PCT/KR2019/009003
§ 371 (c)(1),
(2) Date: Jan. 22, 2021

(87) PCT Pub. No.: WO2020/022716
PCT Pub. Date: Jan. 30, 2020

(65) Prior Publication Data
US 2021/0360390 A1    Nov. 18, 2021

(30) Foreign Application Priority Data

Jul. 24, 2018    (KR) .................. 10-2018-0085751

(51) Int. Cl.
*H04W 8/24*    (2009.01)
*H04W 48/06*    (2009.01)
(Continued)

(52) U.S. Cl.
CPC .............. *H04W 8/24* (2013.01); *H04W 8/12* (2013.01); *H04W 48/06* (2013.01); *H04W 84/12* (2013.01)

(58) Field of Classification Search
CPC ......... H04W 48/06; H04W 8/12; H04W 8/24; H04W 84/12; H04W 88/06
See application file for complete search history.

(56) References Cited

U.S. PATENT DOCUMENTS

| | | | |
|---|---|---|---|
| 10,980,082 B2* | 4/2021 | Fiorani | H04L 69/24 |
| 2016/0157293 A1* | 6/2016 | Pazhyannur | H04W 76/27 |
| | | | 370/329 |

(Continued)

FOREIGN PATENT DOCUMENTS

| | | |
|---|---|---|
| EP | 3267650 | 1/2018 |
| WO | 2017171896 | 10/2017 |

OTHER PUBLICATIONS

PCT International Application No. PCT/KR2019/009003, International Search Report dated Nov. 18, 2019, 3 pages.

*Primary Examiner* — Liton Miah
(74) *Attorney, Agent, or Firm* — Lee Hong Degerman Kang & Waimey

(57) ABSTRACT

A method for controlling a data transmission state by a terminal in a wireless communication system may comprise: transmitting capability configuration information of the terminal to a node of a network; applying a triggered communication environment configuration on the basis of the capability configuration information from the node; transmitting, to the node, first connection configuration information related to a wireless local area network (WLAN) connection configuration; and applying a first communication environment reconfiguration triggered from the node on the basis of the first connection configuration information, wherein the capability configuration information includes LWA function permission information of the terminal.

18 Claims, 17 Drawing Sheets

(51) Int. Cl.
    *H04W 8/12*         (2009.01)
    *H04W 84/12*       (2009.01)

(56) References Cited

U.S. PATENT DOCUMENTS

| | | | |
|---|---|---|---|
| 2016/0227416 A1* | 8/2016 | Suzuki | H04W 72/0453 |
| 2016/0234726 A1 | 8/2016 | Nuggehalli et al. | |
| 2016/0337904 A1* | 11/2016 | Hsu | H04W 28/0289 |
| 2016/0345345 A1* | 11/2016 | Malik | H04W 24/10 |
| 2017/0048839 A1 | 2/2017 | Henttonen et al. | |
| 2017/0311169 A1* | 10/2017 | Cai | H04L 27/0006 |

* cited by examiner

[FIG. 1]
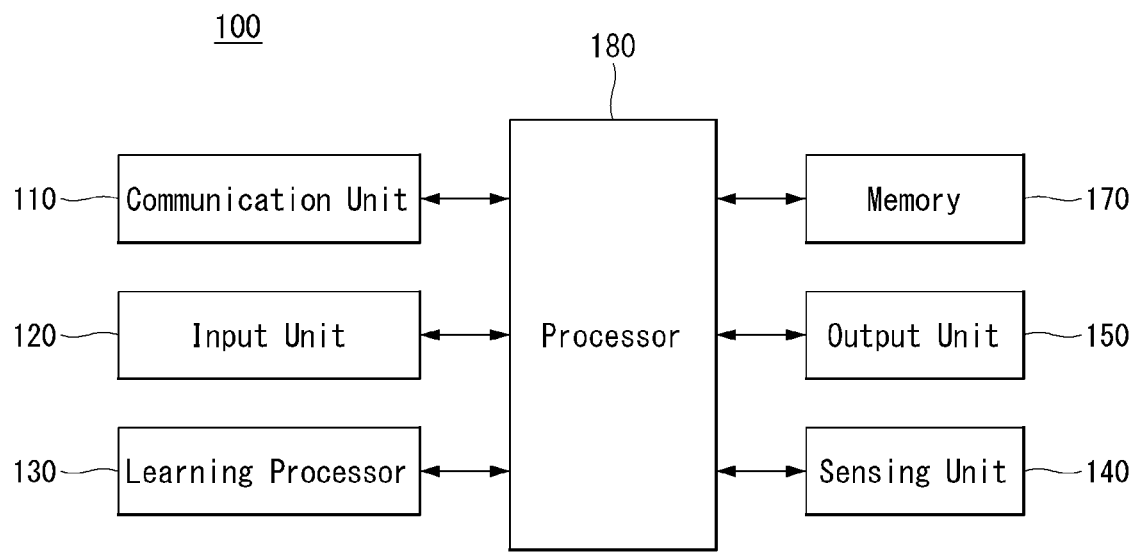
[FIG. 2]
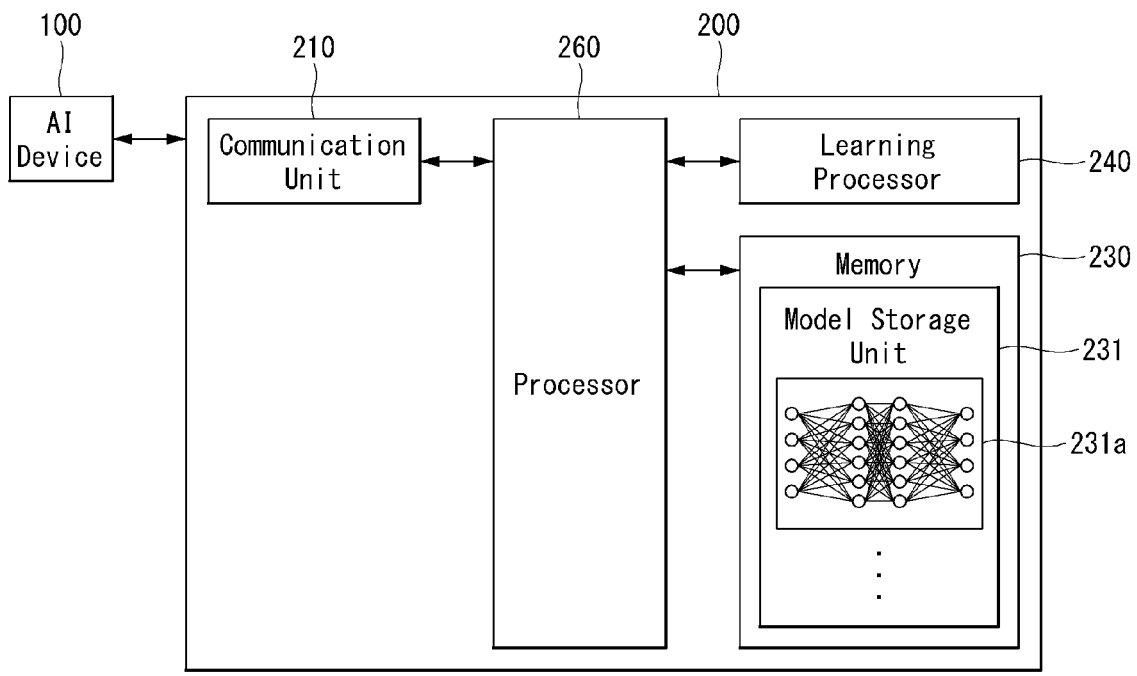

[FIG. 3]
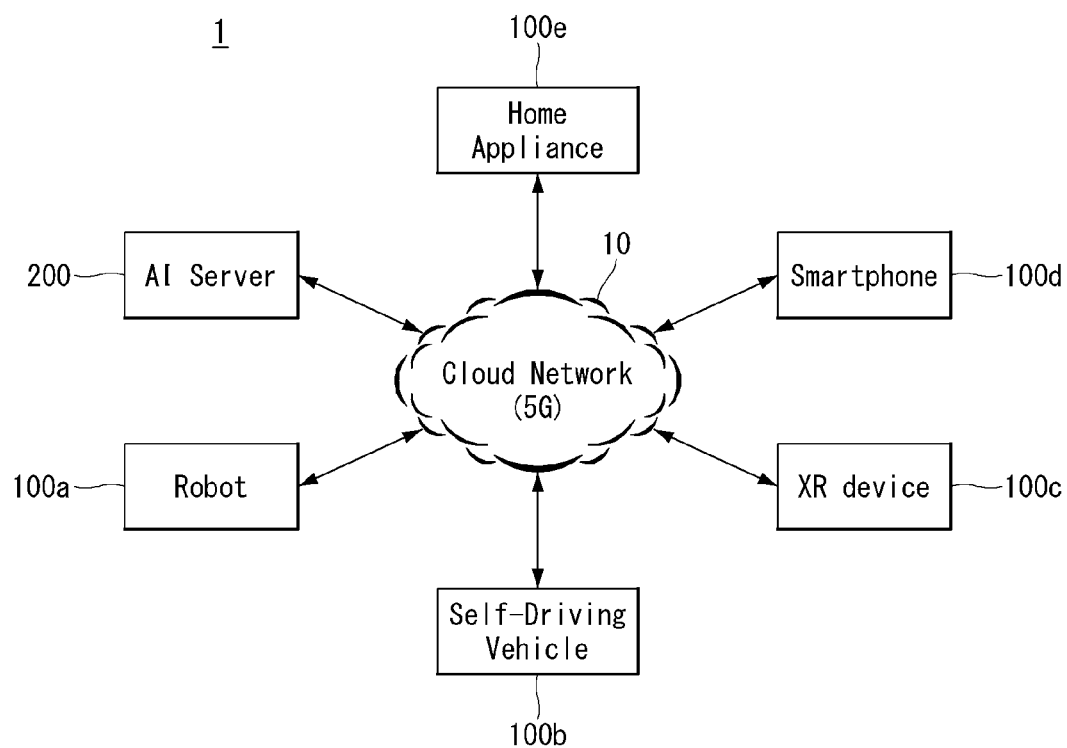

[FIG. 4]
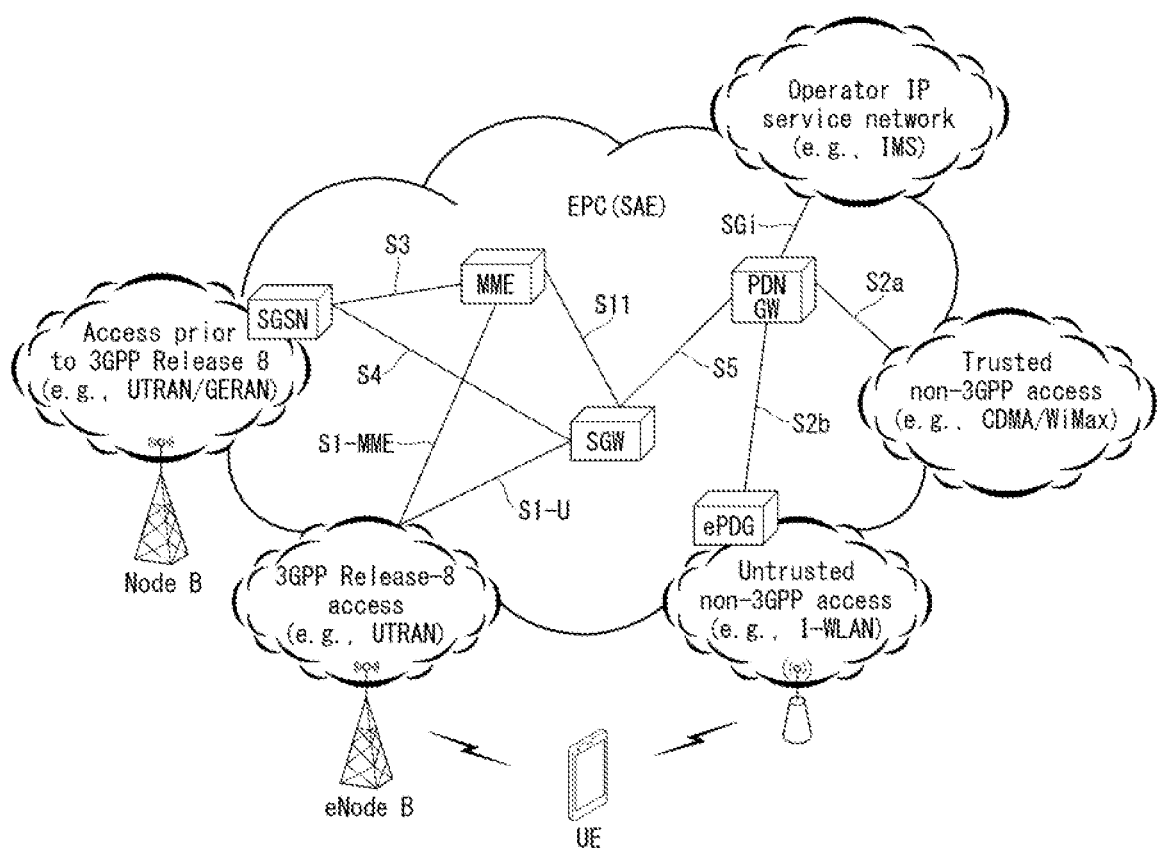

[FIG. 5]
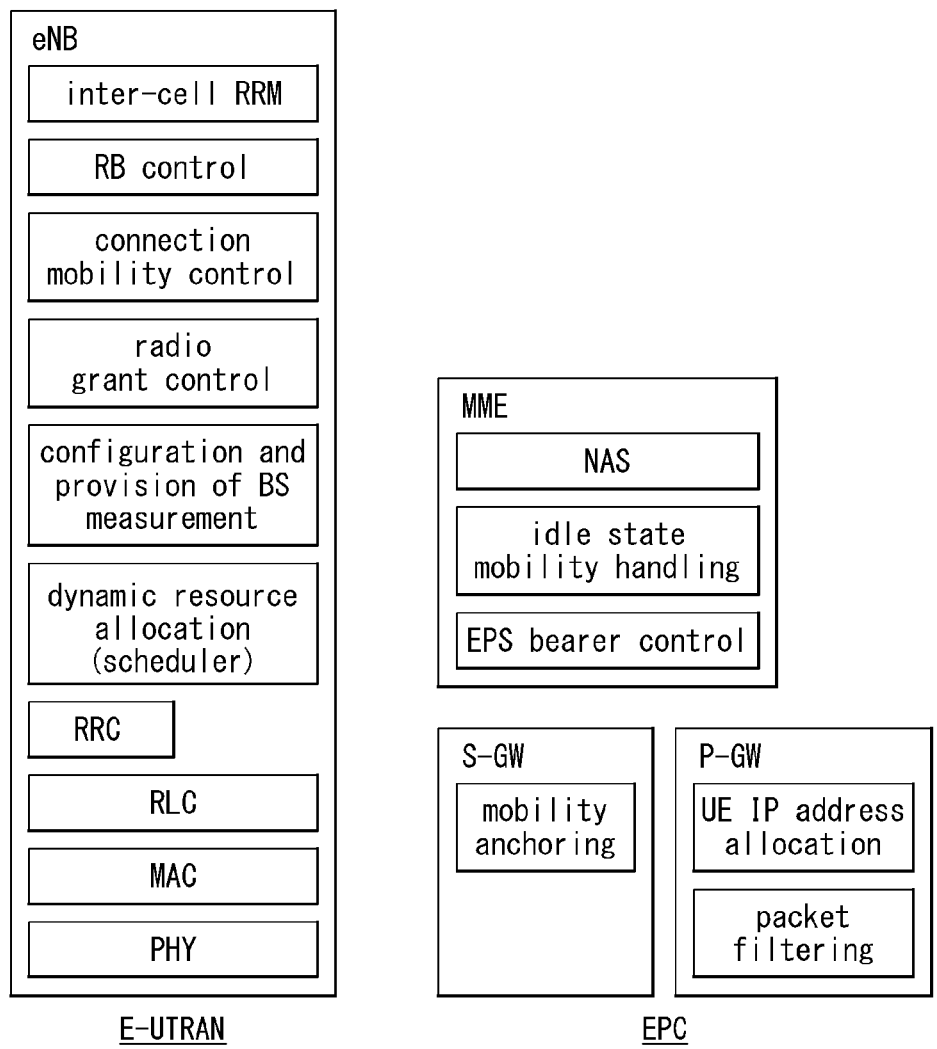

【FIG. 6(a)】
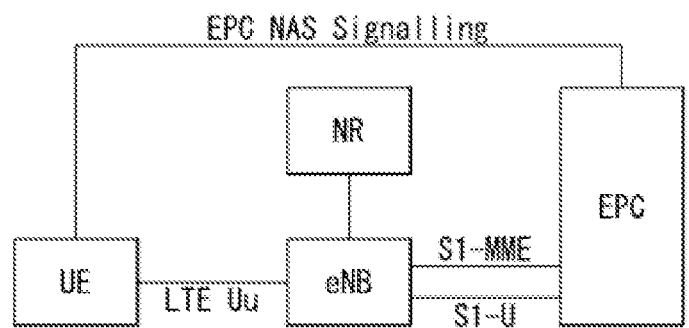
【FIG. 6(b)】
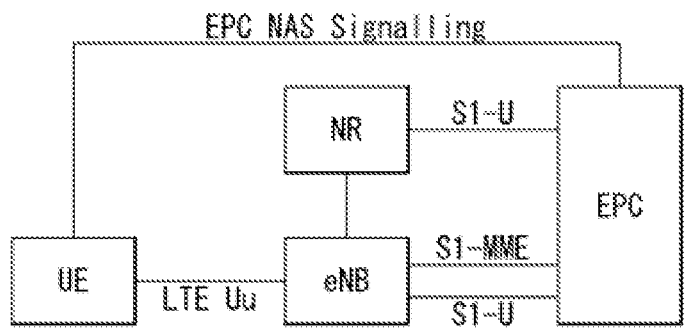

【FIG. 7(a)】
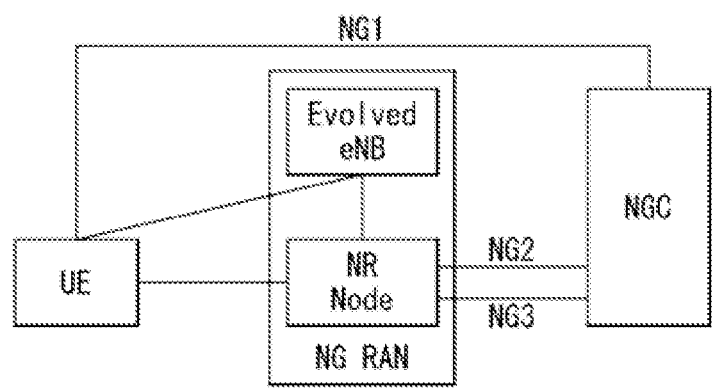
【FIG. 7(b)】
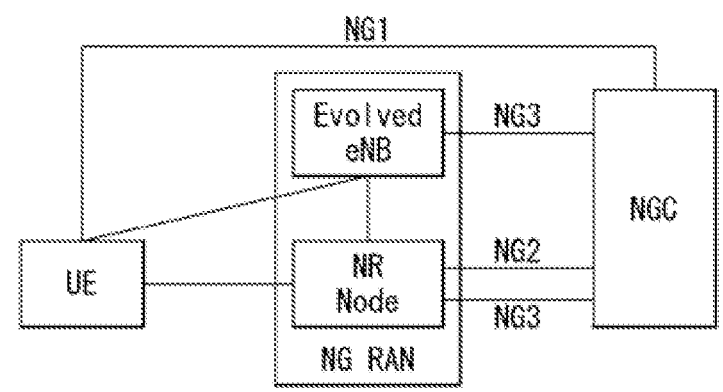

[FIG. 8]
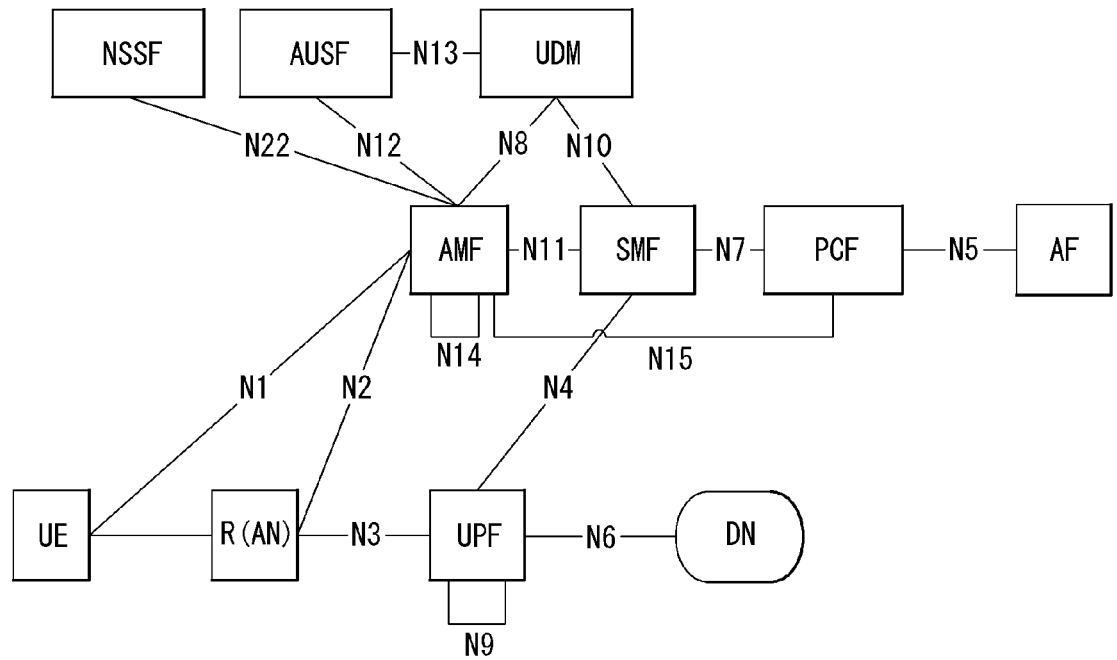
[FIG. 9]
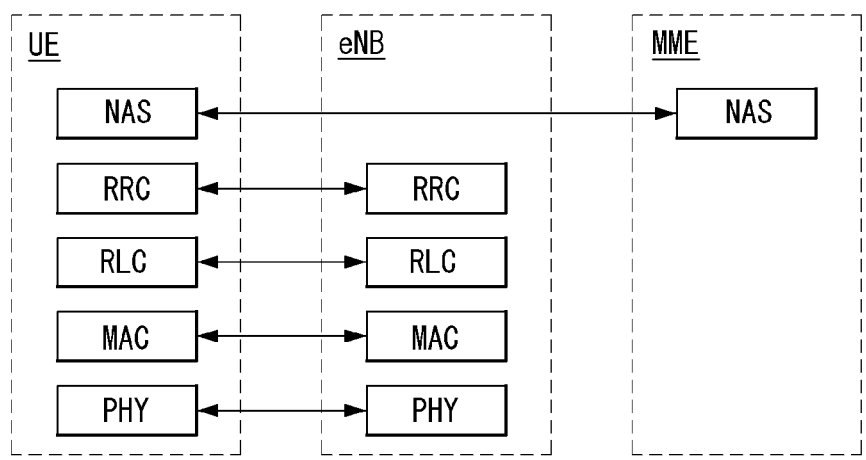

[FIG. 10]
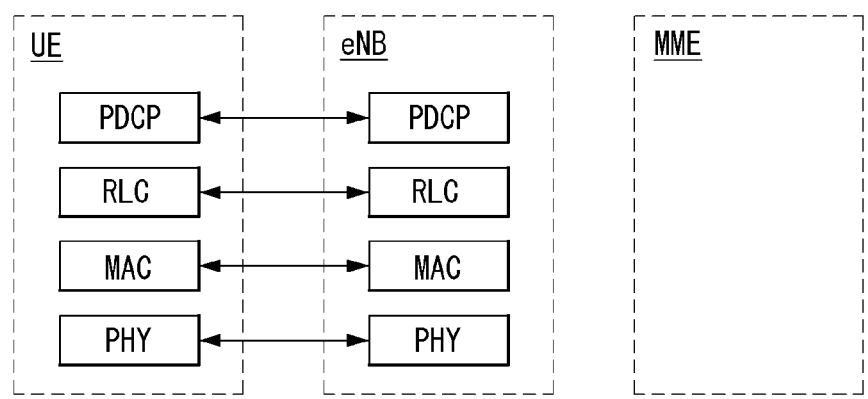

【FIG. 11(a)】
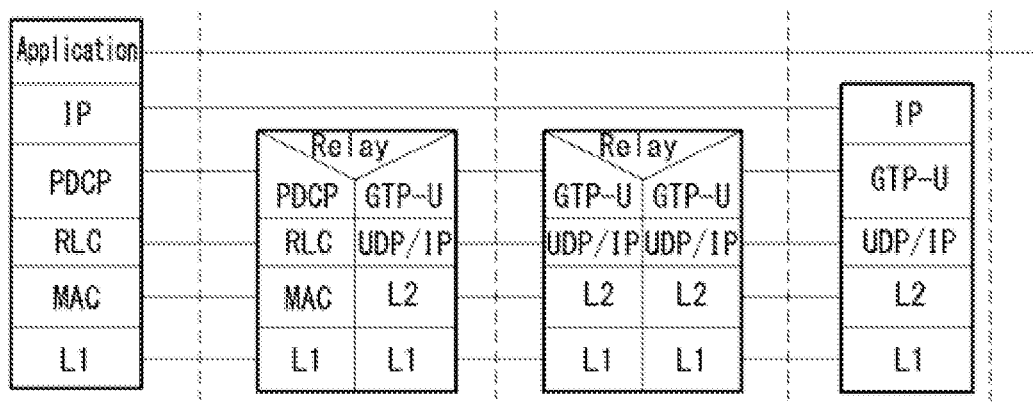
【FIG. 11(b)】
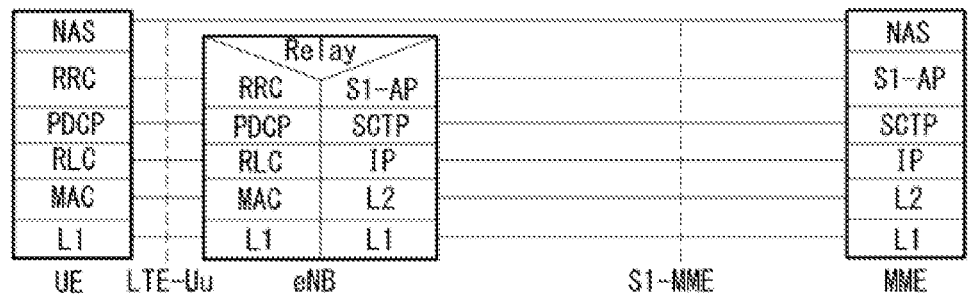

[FIG. 12]
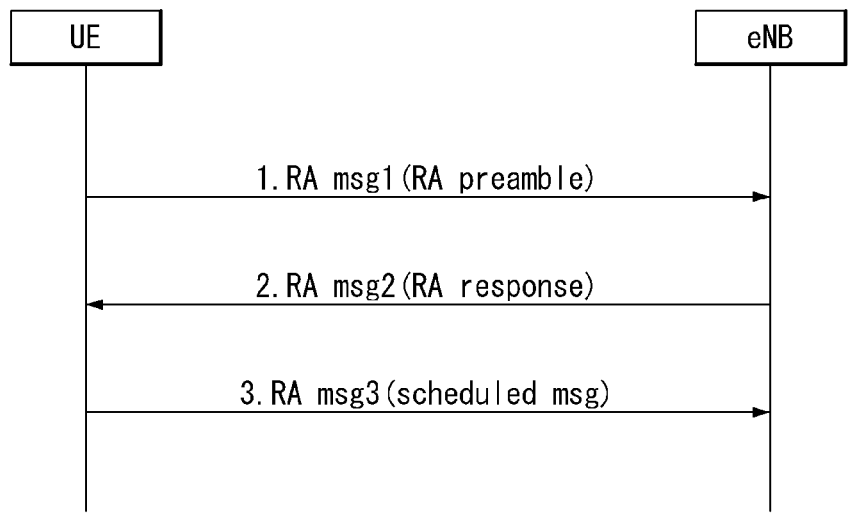
[FIG. 13]
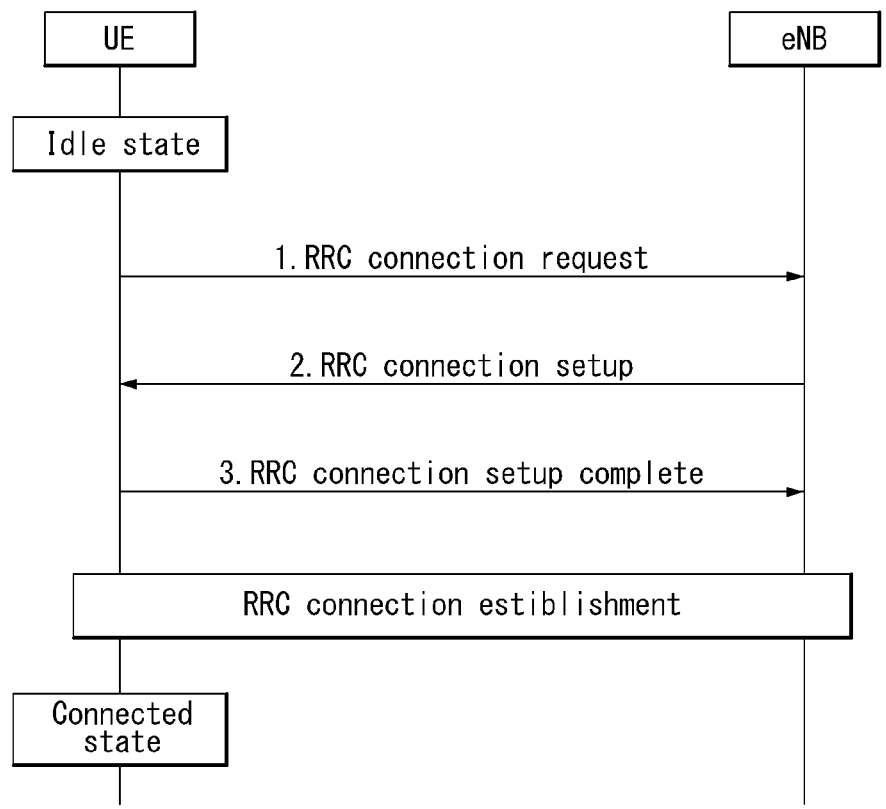

【FIG. 14(a)】
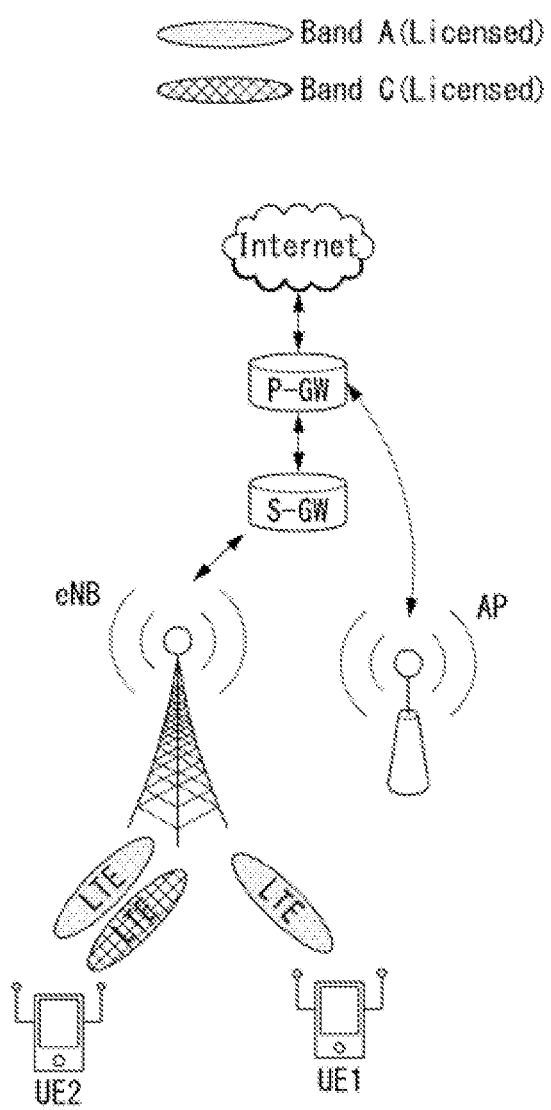

[FIG. 14(b)]
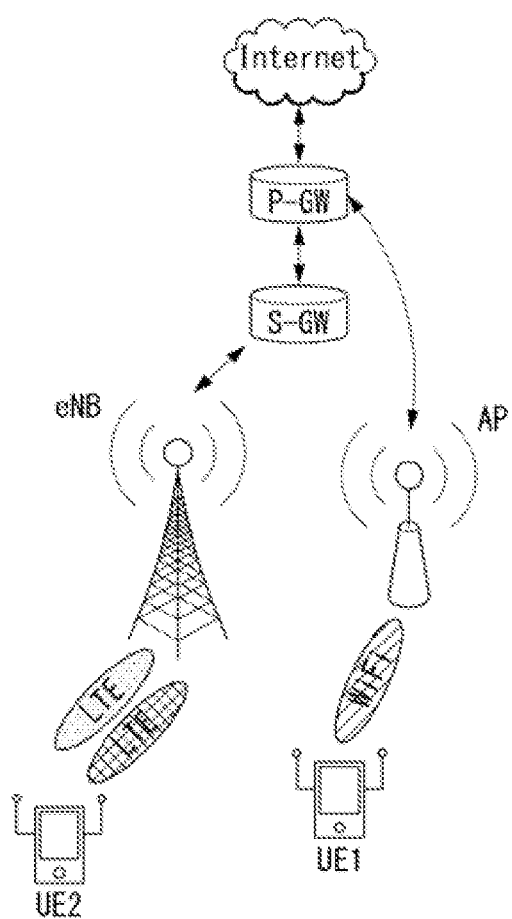

【FIG. 15(a)】
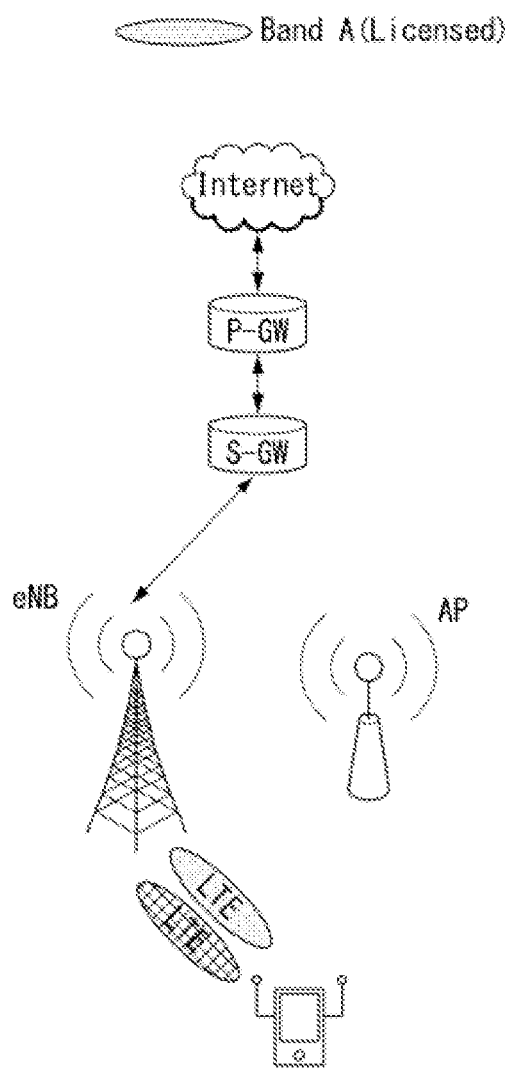

[FIG. 15(b)]
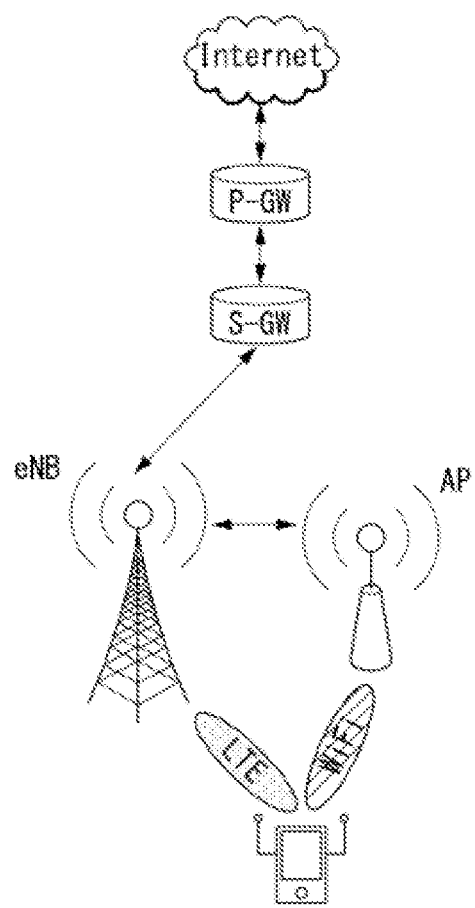

[FIG. 16]
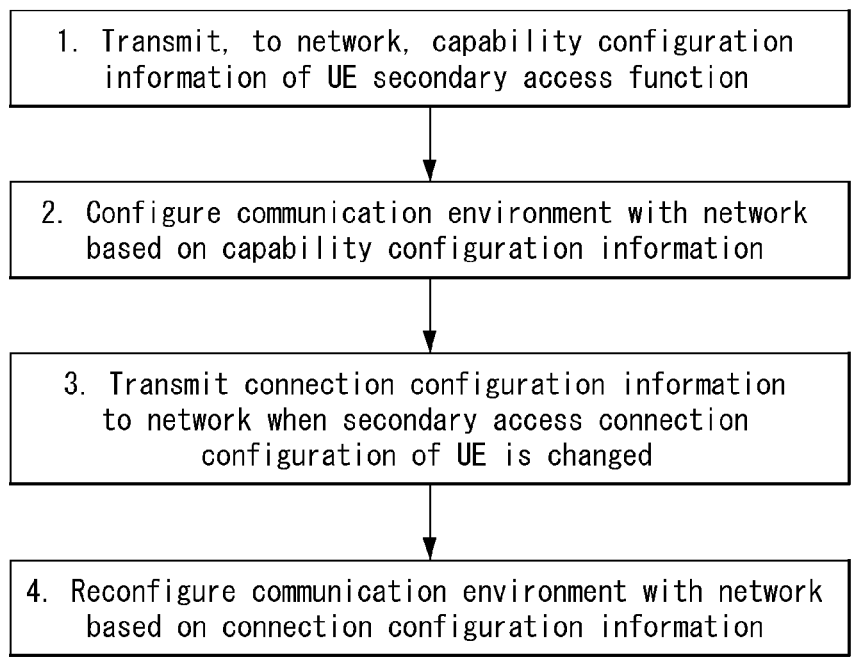

[FIG. 17]
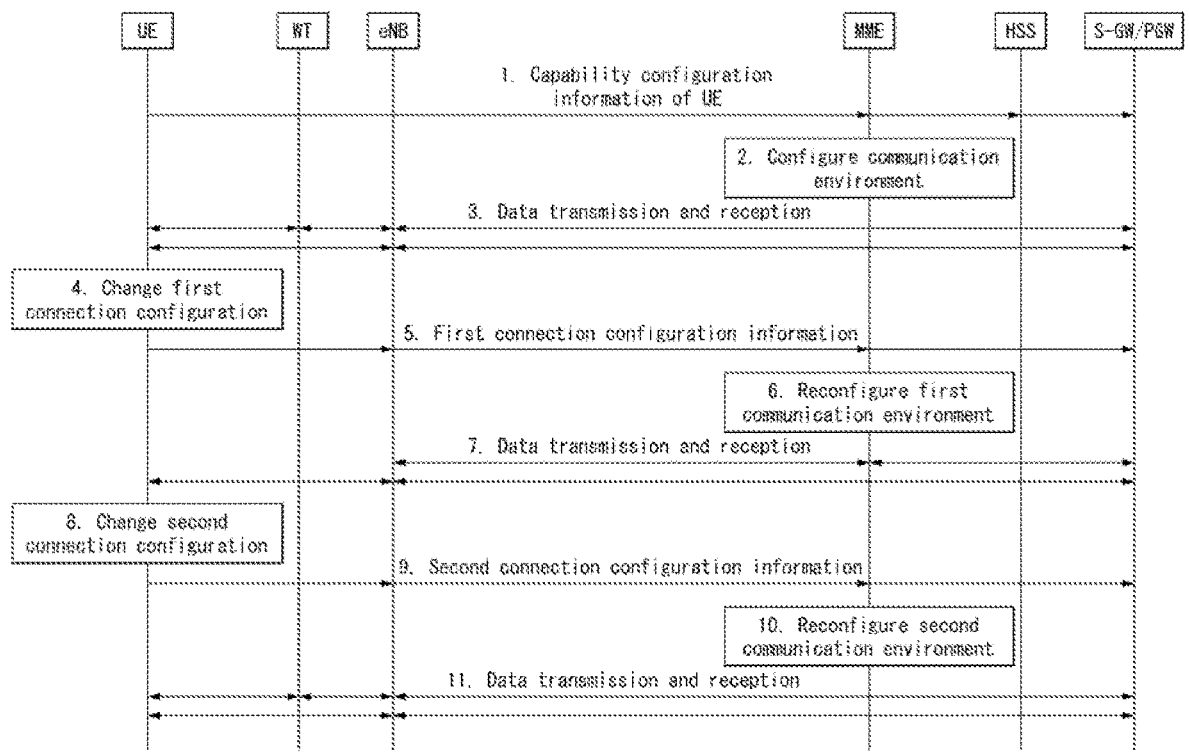

[FIG. 18]
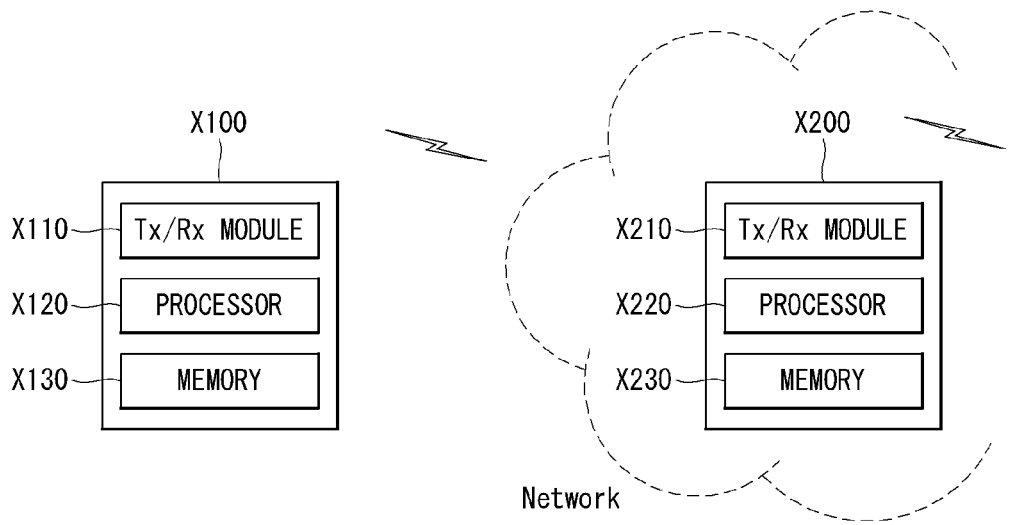
[FIG. 19]
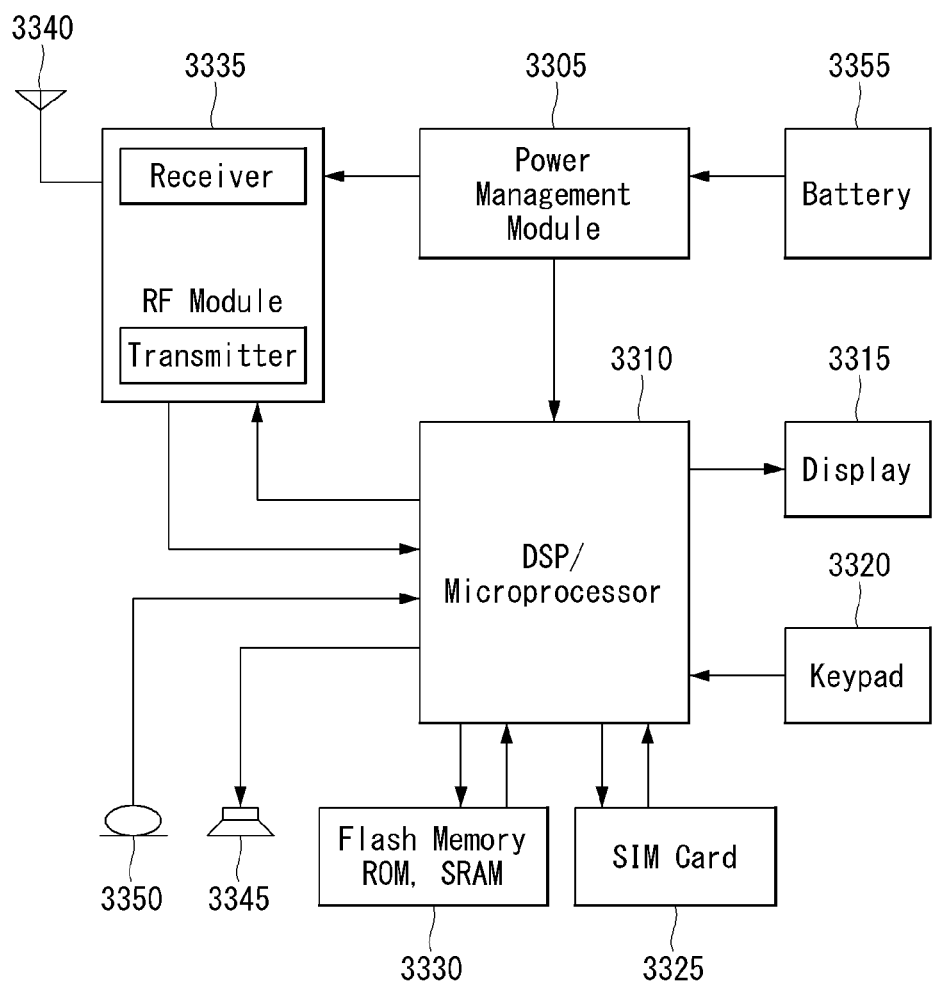

METHOD AND DEVICE FOR CONTROLLING DATA TRANSMISSION STATE IN WIRELESS COMMUNICATION SYSTEM

CROSS-REFERENCE TO RELATED APPLICATIONS

This application is the National Stage filing under 35 U.S.C. 371 of International Application No. PCT/KR2019/009003, filed on Jul. 22, 2019, which claims the benefit of KR Application No. 10-2018-0085751, filed on Jul. 24, 2018, the contents of which is hereby incorporated by reference herein in its entirety.

The present disclosure relates to a method of controlling, by a user equipment, access to a network in a wireless communication system and, more particularly, to a communication system and method for notifying a transmission/reception configuration state of data based on user selection and effectively controlling a load if a radio communication technology is used in a radio technology, such as WiFi, or in an unlicensed band.

BACKGROUND ART

Wireless communication systems are widely deployed to provide various types of communication services, such as voice and data. In general, a wireless communication system is a multi-access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi-carrier frequency division multiple access (MC-FDMA) system, and so on.

Machine-to-machine (M2M) communication, and various devices and technologies, such as a smartphone, and a tablet PC that require a high data transfer rate, appear and supplied. Accordingly, the amount of data that needs to be processed in a cellular network is rapidly increasing. In order to satisfy the data throughput that rapidly increases as described above, a carrier aggregation technology for efficiently using a more frequency band, a cognitive radio technology, a multi-antenna technology for increasing the capacity of data transmitted within a limited frequency, a multi-BS cooperation technology, etc. are developed.

Meanwhile, a communication environment is advanced in a way that the density of nodes capable of being accessed by a user equipment (UE) nearby is increased. The node refers to a fixed point that includes one or more antennas and can transmit/receive a radio signal to the UE. A communication system having a high density of nodes may provide a UE with communication service having higher performance through cooperation between nodes.

DISCLOSURE

Technical Problem

An object of the present disclosure is to propose a method of controlling, by a UE, access to a network.

Furthermore, an object of the present disclosure is to propose a communication system and method for notifying a transmission/reception configuration state of data based on user selection and effectively controlling a load if a radio communication technology is used in a radio technology, such as WiFi, or in an unlicensed band.

Technical objects to be achieved in the present disclosure are not limited to the aforementioned technical objects, and other technical objects not described above may be evidently understood by a person having ordinary skill in the art to which the present disclosure pertains from the following description.

Technical Solution

In an aspect of the present disclosure, a method of controlling, by a user equipment, a data transmission state in a wireless communication system includes transmitting capability configuration information of the user equipment to a node of a network, approving a triggered communication environment configuration based on the capability configuration information from the node, transmitting, to the node, first connection configuration information related to a wireless local area network (WLAN) connection configuration, and approving a triggered first communication environment reconfiguration from the node based on the first connection configuration information, wherein the capability configuration information may include LWA function permission information of the user equipment.

Furthermore, when the capability configuration information indicates LWA function permission of the user equipment, the communication environment configuration may be for activating an LWA connection between the network and the user equipment.

Furthermore, when the first connection configuration information indicates that the user equipment has been connected to a WLAN access point (AP) that does not permit an LWA connection, the first communication environment reconfiguration may be for deactivating the LWA connection.

Furthermore, the method may further include transmitting, to the node, second connection configuration information related to a connection configuration of the WLAN AP, and approving a triggered second communication environment reconfiguration from the node based on the second connection configuration information.

Furthermore, when the second connection configuration information indicates a disconnection with the WLAN AP, the second communication environment reconfiguration may be for activating the LWA connection again.

Furthermore, the node may be a mobility management entity (MME) or a node associated with the mobility of the user equipment.

Furthermore, the method may further include receiving a connectable WLAN AP list from the node, and transmitting information on the WLAN AP to a base station if the user equipment has been connected to a WLAN AP not included in the WLAN AP list.

Furthermore, the method may further include transmitting LWA connection configuration information to the node when an LWA connection configuration of the user equipment is configured as deactivation.

In another aspect of the present disclosure, a method of controlling, by a first node, a data transmission state in a wireless communication system includes receiving capability configuration information of a user equipment from the user equipment, triggering a communication environment configuration based on the capability configuration information, receiving first connection configuration information related to a wireless local area network (WLAN) connection configuration of the user equipment, and triggering a first communication environment reconfiguration based on the first connection configuration information, wherein the capability configuration information may include LWA function permission information of the user equipment.

Furthermore, the method may further include delivering the capability configuration information to a second node of a network, wherein the second node may include a home subscriber server (HSS) or a PDN gateway (P-GW) or a serving gateway (S-GW).

Furthermore, when the capability configuration information indicates LWA function permission of the user equipment, the communication environment configuration may be for activating an LWA connection between the network and the user equipment.

Furthermore, when the first connection configuration information indicates that the UE has been connected to a WLAN access point (AP) that does not permit an LWA connection, the first communication environment reconfiguration may be for deactivating the LWA connection.

Furthermore, the method may further include receiving second connection configuration information related to a connection configuration between the user equipment and the WLAN AP, and triggering a second communication environment reconfiguration based on the second connection configuration information.

Furthermore, the method may further include receiving second connection configuration information related to the connection configuration of the WLAN AP, and triggering the second communication environment reconfiguration based on the second connection configuration information.

Furthermore, when the second connection configuration information indicates a disconnection between the user equipment and the WLAN AP, the second communication environment reconfiguration may be for activating the LWA connection again.

Furthermore, the first node may be a mobility management entity (MME) or a node associated with the mobility of the user equipment.

In another aspect of the present disclosure, a user equipment controlling a data transmission state in a wireless communication system includes a communication module, a display, a memory, and a processor controlling the communication module, the display, and the memory, wherein the processor may be configured to transmit capability configuration information of the user equipment to a node of a network through the communication module, approve a triggered communication environment configuration based on the capability configuration information from the node, transmit, to the node, first connection configuration information related to a wireless local area network (WLAN) configuration through the communication module, and approve a triggered first communication environment reconfiguration from the node based on the first connection configuration information, wherein the capability configuration information may include LWA function permission information of the user equipment.

Furthermore, when the capability configuration information indicates LWA function permission of the user equipment, the communication environment configuration may be for activating an LWA connection between the network and the user equipment.

Furthermore, when the first connection configuration information indicates that the user terminal has been connected to a WLAN access point (AP) that does not permit an LWA connection, the first communication environment reconfiguration may be for deactivating the LWA connection.

Furthermore, the processor may be configured to transmit, to the node, second connection configuration information related to a connection configuration of the WLAN AP through the communication module and to approve a triggered second communication environment reconfiguration from the node based on the second connection configuration information.

Advantageous Effects

According to an embodiment of the present disclosure, a UE can effectively control data transmission to a network in a wireless communication system.

Furthermore, according to an embodiment of the present disclosure, if a radio communication technology is used in a radio technology, such as WiFi, or an unlicensed band, the communication system and method for notifying a transmission/reception configuration state of data based on user selection and effectively controlling a load can be provided.

Effects which may be obtained in the present disclosure are not limited to the aforementioned effects, and other technical effects not described above may be evidently understood by a person having ordinary skill in the art to which the present disclosure pertains from the following description.

DESCRIPTION OF DRAWINGS

FIG. 1 illustrates an AI apparatus according to an embodiment of the present disclosure.

FIG. 2 illustrates an AI server according to an embodiment of the present disclosure.

FIG. 3 illustrates an AI system according to an embodiment of the present disclosure.

FIG. 4 is a diagram illustrating schematic architecture of an evolved packet system (EPS) including an evolved packet core (EPC).

FIG. 5 is an exemplary diagram of common architecture of an E-UTRAN and the EPC.

FIGS. 6(a) and 6(b) are an exemplary diagram if only NR, that is, the radio access technology of 5G, is additionally used in the existing EPS system.

FIGS. 7(a) and 7(b) are an exemplary diagram if LTE radio access is additionally added when an NG RAN and an NGC are used.

FIG. 8 is a block diagram of 5G architecture which may be applied to the present disclosure.

FIG. 9 is an exemplary diagram illustrating a structure of a radio interface protocol in a control plane.

FIG. 10 is an exemplary diagram illustrating a structure of a radio interface protocol in a user plane.

FIGS. 11(a) and 11(b) illustrate long term evolution (LTE) protocol stacks for the user plane and the control plane.

FIG. 12 is a flowchart for describing a process of random access.

FIG. 13 is a diagram illustrating a connection process in a radio resource control (RRC) layer.

FIGS. 14(a) and 14(b) illustrate a flow of a (downlink/uplink) signal between a UE and a network node(s) in a conventional system.

FIGS. 15(a) and 15(b) illustrate a flow of a (downlink/uplink) signal between a UE and a network node(s) in an improved system to which the present disclosure is applied.

FIG. 16 is an embodiment of a user equipment to which the present disclosure may be applied.

FIG. 17 is an embodiment to which the present disclosure may be applied.

FIG. 18 is a diagram illustrating a configuration of a node device to which a proposal of the present disclosure is applied.

FIG. 19 illustrates is a block diagram of a communication apparatus according to an embodiment of the present disclosure.

The accompany drawings, which are included as part of the detailed description in order to help understanding of the present disclosure, provide embodiments of the present disclosure and describe the technical characteristics of the present disclosure along with the detailed description.

Mode for Invention

Terms used in the present disclosure are common terms currently and widely used by taking into consideration functions in the present disclosure, but the terms may be changed depending on an intention of a technician skilled in the art, a precedent, or the advent of a new technology. Furthermore, in a specific case, some terms are randomly selected by the applicant. In this case, the meaning of a corresponding term will be described in detail in the corresponding description of the disclosure. Accordingly, terms used in the present disclosure should be defined based on their substantial meanings and contents over the present disclosure, not the simple names of the terms.

The following embodiments are the results of combining the elements and characteristics of the present disclosure in a specific form. Each of the elements or characteristics may be considered to be optional unless separately explicitly described otherwise. Each of the elements or characteristics may be implemented in a form not combined with another element or characteristic. Furthermore, some elements and/or characteristics may be combined to form an embodiment of the present disclosure. The sequence of the operations described in the embodiments of the present disclosure may be changed. Some elements or characteristics of a specific embodiment may be included in another embodiment or may be substituted with the corresponding elements or characteristics of another embodiment.

In the description of the drawings, a procedure or step that may make the gist of the present disclosure vague has not been described and a procedure or step that may be understood by those skilled in the art has not been described.

In the entire specification, when it is said that a part "comprises or includes" any element, it means that the part does not exclude any element, but may further include another element unless explicitly described to the contrary. Furthermore, the term " . . . unit", " . . . er (or)" or "module" described in the specification means a unit for processing at least one function or operation, and the unit may be implemented by hardware or software or a combination of hardware and software. Furthermore, "a or an", "one", "the" and similar words thereof may be used as a meaning including both singular and plural forms unless they are differently indicated in this specification or are evidently contracted in the context that describes the present disclosure (in particular, in the context of the claims).

Embodiments of the present disclosure may be supported by standard documents disclosed in at least one of the IEEE 802.xx system, the 3GPP system, the 3GPP LTE system, and the 3GPP2 system, that is, radio access systems. That is, evident steps or portions not described among the embodiments of the present disclosure may be described with reference to the documents.

Furthermore, all the terms disclosed in the present disclosure may be described by the standard documents. For example, the present disclosure may be incorporate by reference to one or more of standard documents, such as 3GPP TS 36.211, 3GPP TS 36.213, 3GPP TS 36.321, 3GPP TS 36.322, 3GPP TS 36.323, 3GPP TS 36.331, 3GPP TS 23.203, 3GPP TS 23.401, 3GPP TS 24.301, 3GPP TS 23.228, 3GPP TS 29.228, 3GPP TS 23.218, 3GPP TS 22.011, and 3GPP TS 36.413.

Hereinafter, preferred embodiments according to the present disclosure are described in detail with reference to the accompanying drawings. A detailed description to be disclosed along with the accompanying drawings is to describe an exemplary form of the present disclosure and is not intended to describe a unique embodiment of the present disclosure.

Furthermore, specific terms used in embodiments of the present disclosure are provided to help understanding of the present disclosure. The use of such a specific term may be changed into another form without departing from the technical spirit of the present disclosure.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE may be performed by the base station or by network nodes other than the base station. The term Base Station (BS) may be replaced with a fixed station, Node B, evolved-NodeB (eNB), Base Transceiver System (BTS), or Access Point (AP). Also, a terminal may be fixed or mobile; and the term may be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

3GPP LTE/LTE-A/NR is primarily described for clear description, but technical features of the present disclosure are not limited thereto.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

The present disclosure described below can be implemented by combining or modifying respective embodiments to meet the above-described requirements of 5G.

The following describes in detail technical fields to which the present disclosure described below is applicable.

<Artificial Intelligence (AI)>

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

<Robot>

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

<Self-Driving (Autonomous-Driving)>

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

<Extended Reality (XR)>

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™ radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 2 illustrates an AI server 200 according to an embodiment of the present disclosure.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 illustrates an AI system 1 according to an embodiment of the present disclosure.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

<AI+Robot>

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

<AI+Self-Driving>

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

<AI+XR>

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

<AI+Robot+Self-Driving>

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

<AI+Robot+XR>

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

<AI+Self-Driving+XR>

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

First, terms used in the present disclosure are defined as follows.

IP multimedia subsystem or IP multimedia core network subsystem (IMS): an architectural framework for standardizing and providing voice or another multimedia service on an IP.

Universal mobile telecommunications system (UMTS): a third generation mobile communication technology based on a global system for mobile communication (GSM), developed by 3GPP.

Evolved packet system (EPS): a network system composed of access networks, such as an evolved packet core (EPC) and LTE/UTRAN, that is, a packet switched (PS) core network based on an Internet protocol (IP). This is a network having an improved form of the UMTS.

NodeB: a base station of a GERAN/UTRAN. This is installed outdoors and has coverage of a macro cell scale.

eNodeB/eNB: a base station of an E-UTRAN. This is installed outdoors and has coverage of a macro cell scale.

User equipment (UE): a user equipment. The UE may be referred to as a term, such as a user terminal (UT), a mobile equipment (ME), or a mobile station (MS). Furthermore, the UE may be a portable device, such as a notebook, a mobile phone, a personal digital assistant (PDA), a smartphone, or a multimedia device, or may be a device which cannot be carried, such as a personal computer (PC) or a vehicle mounting device. In MTC-related contents, a UE or a term, such as a UE, may refer to an MTC device.

Home nodeB (HNB): a base station of a UMTS network. This is installed outdoors and has coverage of a microcell scale.

Home eNodeB (HeNB): a base station of an EPS network. This is installed indoors and has coverage of a microcell scale Mobility management entity (MME): a network node of an EPS network which performs mobility management (MM) and session management (SM) functions.

Packet data network-gateway (PDN-GW)/PGW/P-GW: network nodes of an EPS network which perform UE IP address assignment, packet screening and filtering, an charging data collection functions.

Serving gateway (SGW)/S-GW: network nodes of an EPS network which perform mobility anchor, packet routing, idle state packet buffering, and a function of triggering, by an MME, a UE for paging.

Policy and charging rule function (PCRF): a network node of an EPS network which performs a policy decision for dynamically applying differentiated QoS for each service flow and a charging policy.

Open mobile alliance device management (OMA DM): a protocol designed for the management of mobile devices, such as a handheld phone, a PDA, and a portable computer. The protocol performs functions, such as device configuration, firmware upgrade, and error reports.

Operation administration and maintenance (OAM): a network management function group that provides network defect display, performance information, and data and diagnosis functions.

Non-access stratum (NAS): an upper stratum of a control plane between a UE and an MME: this is a function layer for exchanging signaling or traffic messages between a UE and a core network in the LTE/UMTS protocol stack, supports the mobility of the UE and supports a session management procedure for establishing and maintaining an IP connection between a UE and a PDN GW, an IP address management, etc.

EPS mobility management (EMM): a sub-layer of the NAS layer. The EMM may be in an "EMM-Registered" or "EMM-Deregistered" state depending on whether a UE is attached to a network or detached from a network.

EMM connection management (ECM) connection: a signaling connection for the exchanged of NAS messages, established between a UE and the MME. The ECM connection is a logical connection composed of an RRC connection between a UE and an eNB and an S1 signaling connection between an eNB and an MME. When an ECM connection is established/terminate, RRC and S1 signaling connections are likewise established/terminated. An established ECM connection means, to a UE, that it has an RRC connection established with an eNB, and means, to an MME, that it has an S1 signaling connection established with the eNB. ECM may have an "ECM-Connected" or "ECM-Idle" state depending on whether an NAS signaling connection, that is, an ECM connection is established.

Access stratum (AS): this includes a protocol stack between a UE and a radio (or access) network, and is responsible for data and network control signal transmission, etc.

NAS configuration management object (MO): a management object (MO) used in a process of configuring, in a UE, a parameter associated with an NAS functionality.

Packet data network (PDN): a network where server (e.g., a multimedia messaging service (MMS) server, or a wireless application protocol (WAP) server) supporting a specific service is located.

PDN connection: a logical connection between a UE and a PDN represented as one IP address (one IPv4 address and/or one IPv6 prefix).

Access point name (APN): a text string that denotes or classifies a PDN. In order to access a requested service or network, a specific P-GW is used. The APN means a name (text string) predefined within the network so that a P-GW can be found (e.g., internet.mnc012.mcc345.gprs)

Radio access network (RAN): a unit including a NodeB, an eNodeB, and a radio network controller (RNC) controlling the NodeB and the eNodeB in a 3GPP network. The RAN is present between UEs, and provides a connection to a core network.

Home location register (HLR)/home subscriber server (HSS): a database having subscriber information within a 3GPP network. The HS S may perform functions, such as configuration storage, identity management, and user status storage.

Public land mobile network (PLMN): a network configured for the purpose of providing mobile communication services to persons. The PLMN may be classified and configured for each operator.

Access network discovery and selection function (ANDSF): one network entity that provides a policy so that access available for a UE is discovered and selected in an operator unit.

EPC path (or infrastructure data path): a user plane communication path through the EPC E-UTRAN radio access bearer (E-RAB): this refers to concatenation between an S1 bearer and a corresponding data radio bearer. When the E-RAB is present, one-to-one mapping is present between the E-RAB and an EPS bearer of the NAS.

GPRS tunneling protocol (GTP): a group of IP-based communications protocols used to carry general packet radio service (GPRS) within the GSM, the UMTS and LTE networks. GTP and proxy mobile IPv6-based interfaces are specified on various interface points within 3GPP architecture. The GTP may be decomposed into some protocols (e.g., GTP-C, GTP-U and GTP'). The GTP-C is used within a GPRS core network for signaling between gateway GPRS support nodes (GGSN) and serving GPRS support nodes (SGSN). The GTP-C permits the activation (e.g., PDN context activation) of a session for an SGSN user, the deactivation of the same session, the adjustment of quality of service parameters or the update of a session for a subscriber that just operates from another SGSN. The GTP-U is used to carry user data within the GPRS core network and between a radio access network and a core network. FIG. 1 is a diagram illustrating schematic architecture of an evolved packet system (EPS) including an evolved packet core (EPC).

Cell as a radio resource: A 3GPP LTE/LTE-A system uses the concept of a cell in order to manage radio resources. A cell associated with a radio resource is different from a cell of a geographical region. The "cell" associated with a radio resource is defined as a combination of downlink (DL) resources and uplink (UL) resources, that is, a combination of a DL carrier and an UL carrier. A cell may be configured with a DL resource solely or a combination of a DL resource and an UL resource. If a carrier aggregation is supported, linkage between a carrier frequency of a DL resource and a carrier frequency of an UL resource may be indicated by system information. In this case, the carrier frequency means a center frequency of each cell or carrier. In particular, a cell operating on a primary frequency is referred to as a primary cell (Pcell), and a cell operating on a secondary frequency is referred to as a secondary cell (Scell). The Scell means a cell which may be configured after radio resource control (RRC) connection establishment is performed and may be used to provide additional radio resources. Depending on the capabilities of a UE, an Scell, together with a Pcell, may form a set of serving cells for a UE. In the case of a UE which is in the RRC_CONNECTED state, but has a carrier aggregation not configured therein or does not support a carrier aggregation, only one serving cell configured as only a Pcell is present. Meanwhile, the "cell" of a geographical region may be understood as coverage where a node can provide services using a carrier. The "cell" of a radio resource is associated with a bandwidth (BW), that is, a frequency range configured by a carrier. Downlink coverage, that is, a range in which a node may transmit a valid signal, and uplink coverage, that is, a range in which a node may receive a valid signal from a UE, depend on a carrier that carries the corresponding signal. The coverage of the node is associated with coverage of a "cell" of a radio resource used by the node. Accordingly, the term "cell" may be used to mean coverage of service by a node, a radio resource, or a range which may be reached by a signal using a radio resource with valid intensity.

The EPC is a core element of system architecture evolution (SAE) for improving performance of 3GPP technologies. The SAE corresponds to a research object that determines a network structure for supporting mobility between various types of networks. The SAE has an object of providing an optimized packet-based system that supports various radio access technologies based on an IP, for example, IP, and provides further improved data transmission capabilities.

Specifically, the EPC is a core network of an IP mobile communication system for a 3GPP LTE system, and may support packet-based real-time and non-real-time service. In the existing mobile communication system (i.e., second generation or third generation mobile communication system), a function of the core network has been implemented through different two sub-domains of circuit-switched (CS) for voice and packet-switched (PS) for data. However, in the 3GPP LTE system, that is, an evolution of the third generation mobile communication system, the sub-domains of the CS and the PS have been unified into one IP domain. That is, in the 3GPP LTE system, a connection between UEs having IP capabilities may be established through an IO-based base station (e.g., evolved Node B (eNodeB)), the EPC, and an application domain (e.g., IP multimedia sub-system (IMS)). That is, the EPC is a structure essential for an end-to-end IP service implementation.

The EPC may include various components. FIG. 1 illustrates a serving gateway (SGW), a packet data network gateway (PDN GW), a mobility management entity (MME), a serving general packet radio service (GPRS) supporting node (SGSN), and an enhanced packet data gateway (ePDG), that is, some of the various components.

The SGW (or S-GW) operates as a boundary point between a radio access network (RAN) and a core network, and is an element having a function for maintaining a data path between an eNB and the PDN GW. Furthermore, if a UE moves over a region served by an eNB, the SGW acts as a local mobility anchor point. That is, for mobility within the E-UTRAN (within an evolved-universal mobile telecommunications system (UMTS) terrestrial radio access network defined after 3GPP release-8), packets may be routed through the SGW. Furthermore, the SGW may function as an anchor point for mobility with another 3GPP network (a RAN defined prior to 3GPP release-8, for example, a UTRAN or a global system for mobile communication (GSM) (GERAN)/enhanced data rates for global evolution (EDGE) radio access network).

The PDN GW (or P-GW) corresponds to a termination point of a data interface toward a packet data network. The PDN GW may support policy enforcement features, packet filtering, charging support, etc. Furthermore, the PDN GW (or P-GW) may function as an anchor point for mobility management with a 3GPP network and non-3GPP networks (e.g., an untrusted network such as an I-interworking wireless local area network (WLAN) and a trusted network such as a code division multiple access (CDMA) network or WiMax).

The example of a network structure of FIG. 4 illustrates that the SGW and the PDN GW are configured as separate gateways, but the two gateways may be implemented according to a single gateway configuration option.

The MME is an element that performs access to a network connection of a UE and signaling and control functions for supporting the assignment, tracking, paging, roaming, handover, etc. of network resources. The MME controls control plane functions related to subscriber and session management. The MME manages many eNBs and performs signaling for selecting a conventional gateway for handover for another 2G/3G network. Furthermore, the MME performs functions, such as security procedures, terminal-to-network session handling, and idle terminal location management.

The SGSN handles all packet data, such as the mobility management and authentication of a user for another 3GPP network (e.g., GPRS network).

The ePDG acts as a security node for an untrusted non-3GPP network (e.g., I-WLAN, WiFi hotspot).

As described with reference to FIG. 4, a UE having an IP capability may access an IP service network (e.g., IMS) provided by a service provider (i.e., operator) via various elements within the EPC based on non-3GPP access in addition to 3GPP access.

Furthermore, FIG. 4 illustrates various reference points (e.g., S1-U and S1-MME). In the 3GPP system, a conceptual link that connects two functions present in different function entities of the E-UTRAN and the EPC is defined as a reference point. Table 1 lists reference points illustrated in FIG. 4. In the examples of Table 1, various reference points may be present depending on a network structure.

TABLE 1

| Reference point | Description |
|---|---|
| S1-MME | Reference point for the control plane protocol between E-UTRAN and MME) |
| S1-U | Reference point between E-UTRAN and Serving GW for the per bearer the user plane tunneling and inter eNodeB path switching during handover |
| S3 | It enables user and bearer information exchange for inter 3GPP access network mobility in idle and/or active state. This reference point can be used intra-PLMN or inter-PLMN (e.g., in the case of Inter-PLMN HO) |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to the UE mobility and if Serving GW needs to connect to a non-collocated the PDN GW for the required the PDN connectivity. |
| S11 | Reference point for control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

S2a and S2b among the reference point illustrated in FIG. 4 correspond to non-3GPP interfaces. S2a is a reference point that provides the user plane with related control and mobility support between trusted non-3GPP access and the PDN GW. S2b is a reference point that provides the user plane with related control and mobility support between an ePDG and the PDN GW.

FIG. 5 is an exemplary diagram of common architecture of the E-UTRAN and the EPC.

As illustrated, an eNB may perform functions for routing to a gateway while a radio resource control (RRC) connection is activated, the scheduling and transmission of a paging message, the scheduling and transmission of a broadcasting channel (BCH), dynamic assignment of resources in the uplink and downlink to a UE, a configuration and providing for the measurement of the eNB, radio bearer control, radio admission control, connection mobility control, etc. Functions, such as paging occurrence, LTE IDLE state management, the encryption of the user plane, SAE bearer control, and the encryption and integrity protection of NAS signaling, may be performed within the EPC.

Annex J of 3GPP TR 23.799 illustrates various types of architecture in which 5G and 4G are combined. Furthermore, 3GPP TS 23.501 illustrates architecture using the NR and the NGC.

FIGS. 6(a) and 6(b) are an exemplary diagram if only NR, that is, the radio access technology of 5G, is additionally used in the existing EPS system.

In FIGS. 6(a) and 6(b), an eNB additionally manages radio resources using the NR in addition to radio resource management using LTE. Accordingly, such an eNB may provide various access opportunities using both LTE and NR. FIG. 6(a) is a case where an NR cell accesses a core network via an eNB, and FIG. 6(b) is a case where NR is directly accessed to a core network.

FIGS. 7(a) and 7(b) are an example if LTE radio access is additionally added in the situation in which an NG RAN and an NGC are used, which is opposite to FIGS. 6(a) and 6(b).

In FIGS. 7(a) and 7(b), an NR node additionally manages radio resources using LTE using an eNB in addition to radio resource management using NR. Accordingly, such an NR node may provide various access opportunities using both LTE and NR. FIG. 7(a) is a case where traffic of an eNB accesses a core network via an NR node, and FIG. 7(b) is a case where traffic of an eNB directly accesses a core network.

FIG. 8 illustrates an example of common architecture of 5G. Each reference interface and node in FIG. 8 is described below.

An access and mobility management function (AMF) supports functions, such as signaling between CN nodes for mobility between 3GPP access networks, the termination of a radio access network (RAN) CP interface (N2), the termination (N1) of NAS signaling, registration management (registration area) management, idle mode UE reachability, the support of network slicing, and SMF selection.

Some or all of the functions of the AMF may be supported within a single instance of one AMF.

A data network (DN) means an operator service, Internet access or a $3^{rd}$ party service, for example. The DN transmits a downlink protocol data unit (PDU) to the UPF and receives, from the UPF, a PDU transmitted by a UE.

A policy control function (PCF) provides a function for receiving information on a packet flow from an application server and determining a policy, such as mobility management or session management.

A session management function (SMF) provides a session management function, and may be managed by a different SMF for each session if a UE has multiple sessions.

Some or all of the functions of the SMF may be supported within a single instance of one SMF.

Unified data management (UDM) stores subscription data, policy data, etc. of a user.

A user plane function (UPF) transfers, to a UE, a downlink PDU received from the DN via an (R)AN, and transfers, to the DN, an uplink PDU received from the UE via the (R)AN.

An application function (AF) interoperates with a 3GPP core network for providing service (e.g., support functions for an application influence on traffic routing, network capability exposure access, and interoperation with a policy framework for policy control).

A (radio) access network ((R)AN) generally refers to a new radio access network that supports an evolved E-UTRA (E-UTRA), that is, an evolved version of the 4G radio access technology, and a new radio access technology (NR) (e.g., gNB).

A gNB supports functions (i.e., radio bearer control, radio admission control, connection mobility control, and dynamic allocation (i.e., scheduling) of resources to a UE in the uplink/downlink 에서 the UE) for radio resource management.

A user equipment (UE) means a user device.

In the 3GPP system, a conceptual link that connects NFs within a 5G system is defined as a reference point.

N1 means a reference point between a UE and an AMF, N2 means a reference point between an (R)AN and an AMF, N3 means a reference point between an (R)AN and a UPF, N4 means a reference point between an SMF and a UPF, N6 means a reference point between a UPF and a data network, N9 means a reference point between two core UPFs, N5 means a reference point between a PCF and an AF, N7 means a reference point between an SMF and a PCF, N24 means a reference point between a PCF within a visited network and a PCF within a home network, N8 means a reference point between a UDM and an AMF, N10 means a reference point between a UDM and an SMF, N11 means a reference point between an AMF and an SMF, N12 means a reference point between an AMF and an authentication Server function (AUSF), N13 means a reference point between a UDM and an AUSF, N14 means a reference point between two AMFs, N15 means a reference point between a PCF and an AMF in a case of a non-roaming scenario and means a reference point between a PCF and an AMF within a visited network in a case of a roaming scenario, N16 means a reference point between two SMFs (a reference point between an SMF within a visited network and an SMF within a home network in a roaming scenario), N17 means a reference point between an AMF and an equipment identity register (5G-EIR), N18 means a reference point between an AMF and an unstructured data storage function (UDSF), N22 means a reference point between an AMF and a network slice selection function (NSSF), N23 means a reference point between a PCF and a network data analytics function (NWDAF), N24 means a reference point between an NSSF and an NWDAF, N27 means a reference point between a network repository function (NRF) within a visited network and an NRF within a home network, N31 means a reference point between an NSSF within a visited network and an NSSF within a home network, N32 means a reference point between a security protection proxy (SEPP) within a visited network and an SEPP within a home network, N33 means a reference point between a network exposure function (NEF) and an AF, N40 means a reference point between an SMF and a charging function (CHF), and N50 means a reference point between an AMF and a circuit bearer control function (CBCF).

Meanwhile, FIG. 8 illustrates a reference model if a UE accesses one DN using one PDU session, for convenience of description, but the present disclosure is not limited thereto.

Hereinafter, an EPS system is basically described using an eNB for convenience of description. The eNB, the mobility management (MM) function of the MME, the SM function of the S/P-GW, a user plane related function of the S/P-GW, and a function of the PCRF may be substituted with components of a 5G system, using a gNB, the AMF, the SMF, the UPF, and the PCF, respectively.

FIG. 9 is an exemplary diagram illustrating a structure of a radio interface protocol in a control plane between a UE and an eNB, and FIG. 10 is an exemplary diagram illustrating a structure of a radio interface protocol in a user plane between a UE and an eNB.

The radio interface protocol is based on a 3GPP radio access network standard. The radio interface protocol is horizontally composed of a physical layer, a data link layer and a network layer, and is vertically divided into a user plane for data information transmission and a control plane for control signal delivery.

The protocol layers may be divided into an L1 (first layer), an L2 (second layer), and an L3 (third layer) based on the lower three layers of an open system interconnection (OSI) reference model widely known in a communication system.

Hereinafter, each layer of a radio protocol of the control plane illustrated in FIG. 9 and each layer of a radio protocol in the user plane illustrated in FIG. 10 are described.

The physical layer, that is, the first layer, provides information transfer service using a physical channel. The physical layer has been connected to a medium access control layer placed on the upper side through a transport channel. Data between the medium access control layer and the physical layer is transferred through the transport channel. Furthermore, data is transferred through a physical channel between different physical layers, that is, physical layers between the transmission side and the reception side.

The physical channel is composed of several subframes on a time axis and several subcarriers on a frequency axis. In this case, one subframe is composed of a plurality of OFDM symbols and a plurality of subcarriers on the time axis. One subframe is composed of a plurality of resource blocks. One resource block is composed of a plurality of OFDM symbols and a plurality of subcarriers. A transmission time interval (TTI), that is, a unit time during which data is transmitted, is 1 ms corresponding to 1 subframe.

The physical channels present in the physical layers on the transmission side and the reception side may be divided into a physical downlink shared channel (PDSCH) and a physical uplink shared channel (PUSCH), that is, data channels, and a physical downlink control channel (PDCCH), a physical control format indicator channel (PCFICH), a physical Hybrid-ARQ indicator channel (PHICH), and a physical uplink control channel (PUCCH), that is, control channels, according to 3GPP LTE.

Several layers are present in the second layer. First, the medium access control (MAC) layer of the second layer functions to map various logical channels to various transport channels, and also acts as logical channel multiplexing for mapping several logical channels to one transport channel. The MAC layer has been connected to a RLC layer, that is, an upper layer, through a logical channel. The logical channel is basically divided into a control channel that transmits information of the control plane and a traffic channel that transmits information of the user plane, depending on the type of transmitted information.

The radio link control (RLC) layer of the second layer functions to adjust the size of data, received from an upper layer, through segmentation and concatenation so that the data is suitable for a lower layer to transmit the data in a radio interval.

The packet data convergence protocol (PDCP) layer of the second layer performs a header compression function for reducing the size of an IP packet header having a relatively large size and containing unnecessary control information in order to efficiently transmit the IP packet, such as IPv4 or IPv6, in a radio interval having a small bandwidth when transmitting the IP packet. Furthermore, in the LTE system, the PDCP layer also performs a security function, which is composed of ciphering for preventing third party data wiretapping and integrity protection for preventing a third party data manipulation.

The radio resource control (hereinafter abbreviated as an "RRC") layer located at the top of the third layer is defined in only the control plane, is related to a configuration, reconfiguration and release of radio bearers (hereinafter abbreviated as "RB"), and is responsible for control of the logical channel, the transport channel and the physical channel. In this case, the RB means service provided by the second layer for data transfer between a UE and an E-UTRAN.

If an RRC connection is established between the RRC layer of a UE and the RRC layer of a radio network, the UE is in an RRC connected mode. If not, the UE is in an RRC idle state.

Hereinafter, the RRC state and RRC connection method of a UE is described. The RRC state means whether the RRC of the UE has been logically connected to the RRC of the E-UTRAN. A case where the RRC of the UE is connected to the RRC of the E-UTRAN is called the RRC_CONNECTED state. A case where the RRC of the UE is not connected to the RRC of the E-UTRAN is called the RRC_IDLE state. A UE in the RRC_CONNECTED state has an RRC connection, and thus an E-UTRAN may check the presence of the UE in a cell unit. Accordingly, the E-UTRAN may effectively control the UE. In contrast, an E-UTRAN cannot check the presence of a UE in the RRC_IDLE state. A core network manages the UE in a tracking area (TA) unit, that is, an area unit greater than a cell. That is, whether the UE in the RRC_IDLE state is present has only to be checked in an area unit greater than a cell. In order to receive common mobile communication service, such as voice or data, the corresponding UE needs to make a transition to the RRC_CONNECTED state. Each TA is identified based on a tracking area identity (TAI). A UE may configure a TAI through a tracking area code (TAC), that is, information broadcasted by a cell.

When a user first turns on a UE, the UE first searches for a proper cell, sets up an RRC connection with a corresponding cell, and registers its information with a core network. Thereafter, the UE stays in the RRC_IDLE state. The UE in the RRC_IDLE state (re)selects a cell, if necessary, and checks system information or paging information. This is called that the UE camps on the cell. When it is necessary to set up an RRC connection, the UE in the RRC_IDLE state establishes RRC and an RRC connection with an E-UTRAN through an RRC connection procedure and shifts to the RRC_CONNECTED state. A case where the UE in the RRC_IDLE state needs to set up an RRC connection includes several types. The types may include that the UE requires a call attempt, a data transmission attempt, etc. of a user or requires the transmission of a corresponding response message, etc. when receiving a paging message from the E-UTRAN, for example.

A non-access stratum (NAS) layer located over the RRC layer performs functions, such as session management and mobility management.

The NAS layer illustrated in FIG. 9 is described in detail below.

An evolved session management (ESM) belonging to the NAS layer is responsible for control that enables a UE to use PS service from a network by performing functions, such as default bearer management and dedicated bearer management. A default bearer resource is characterized in that it is assigned by a specific packet data network (PDN) when the network is accessed upon first access to the network. In this case, the network assigns an IP address available for a UE so that the UE can use data service and assigns QoS of a default bearer. In LTE, two types of a bearer having a guaranteed bit rate (GBR) QoS characteristic that guarantees a specific bandwidth for data transmission/reception and a non-GBR bearer having the best effort QoS characteristic without guaranteeing a bandwidth are supported. In the case of a default bearer, a non-GBR bearer is assigned. In the case of a dedicated bearer, a bearer having a QoS characteristic of a GBR or non-GBR may be assigned.

A bearer assigned to a UE by a network is called an evolved packet service (EPS) bearer. When assigning the EPS bearer, the network assigns one ID. This is called an EPS bearer ID. One EPS bearer has QoS characteristics of a maximum bit rate (MBR) or/and a guaranteed bit rate (GBR).

FIGS. 11(a) and 11(b) illustrate LTE protocol stacks for the user plane and the control plane. FIG. 11(a) illustrates user plane protocol stacks over a UE-eNB-SGW-PGW-PDN, and FIG. 11(b) illustrates control plane protocol stacks over a UE-eNB-MME-SGW-PGW. The functions of key layers of the protocol stacks are described in brief below.

Referring to FIG. 11(a), a GTP-U protocol is used to forward user IP packets (over) on an S1-U/S5/X2 interface. During LTE handover, when a GTP tunnel is established for data forwarding, an end marker packet is transferred on the GTP tunnel as the last packet.

Referring to FIG. 11(b), an S1AP protocol is applied to an S1-MME interface. The S1AP protocol supports functions, such as S1 interface management, E-RAB management, NAS signaling transfer, and the UE context management. The S1AP protocol transfers initial UE context to an eNB in order to set up an E-RAB(s) and then manages the modification or release of the UE context. A GTP-C protocol is applied to S11/S5 interfaces. The GTP-C protocol supports the exchange of control information for the generation, modification and termination of a GTP tunnel(s). The GTP-C protocol generates data forwarding tunnels in the case of LTE handover.

The description of the protocol stacks and interfaces illustrated in FIGS. 9 and 10 may also be applied to the same protocol stacks and interfaces of FIGS. 11(a) and 11(b) without any change.

FIG. 12 is a flowchart illustrating a random access process in 3GPP LTE.

The random access process is performed to obtain, by a UE, UL sync with a base station and to have, by the UE, an UL radio resource assigned thereto.

The UE receives a root index and a physical random access channel (PRACH) configuration index from an eNB. 64 candidate random access (RA) preambles defined by a Zadoff-Chu (ZC) sequence are present in each cell. The root index is a logical index for enabling the UE to generate the 64 candidate random access preambles.

The transmission of the random access preamble is restricted to a specific time and frequency resource for each cell. The PRACH configuration index indicates a specific subframe and preamble format in which a random access preamble may be transmitted.

A random access process, in particular, a contention-based random access process includes the following three steps. Messages transmitted in the following steps 1, 2, and 3 are also denoted as msg1, msg2, and msg4, respectively.

1. A UE transmits a randomly selected random access preamble to an eNB. The UE selects one of 64 candidate random access preambles. Furthermore, the UE selects a corresponding subframe based on a PRACH configuration index. The UE transmits the selected random access preamble in the selected subframe.

2. An eNB that has received the random access preamble transmits a random access response (RAR) to the UE. The random access response is detected through two steps. First, the UE detects a PDCCH masked with a random access-RNTI (RA-RNTI). The UE receives a random access response within a medium access control (MAC) protocol data unit (PDU) on a PDSCH indicated by the detected PDCCH. The RAR includes timing advance (TA) information indicative of timing offset information for UL synchronization, UL resource grant information, a temporary UE identity (e.g., temporary cell-RNTI or TC-RNTI), etc.

3. The UE may perform UL transmission based on resource assignment information (i.e., scheduling information) within the RAR and a TA value. An HARQ is applied to the UL transmission corresponding to the RAR. Accordingly, after performing the UL transmission, the UE may receive reception response information (e.g., PHICH) corresponding to the UL transmission.

FIG. 13 illustrates a connection process in the radio resource control (RRC) layer.

As illustrated in FIG. 13, RRC states are illustrated depending on an RRC connection. The RRC state indicates whether the entity of the RRC layer of a UE has been logically connected to the entity of the RRC layer of an eNB. A case where the entity of the RRC layer of the UE has been connected to the entity of the RRC layer of the eNB is called an RRC connected state. A case where the entity of the RRC layer of the UE has not been connected to the entity of the RRC layer of the eNB is called an RRC idle state.

The UE in the connected state has the RRC connection, and an E-UTRAN can check the presence of the corresponding UE in a cell unit. Accordingly, the E-UTRAN may effectively control the UE. In contrast, the UE in the idle state cannot check an eNB. A core network manages the UE in a tracking area unit, that is, an area unit greater than a cell. The tracking area is a set unit of cells. That is, only the presence of the UE in the idle state is checked in the area unit. In order to receive common mobile communication service, such as voice or data, the UE needs to make transition to the connected state.

When a user first turns on a UE, the UE first searches for a proper cell and then stays in the idle state in the corresponding cell. When it is necessary to set up an RRC connection, the UE in the idle state sets up an RRC connection with the RRC layer of an eNB through an RRC connection procedure and makes a transition to the RRC connected state.

A case where the UE in the idle state needs to set up the RRC connection includes several types. The types may include that the UE requires a call attempt, a data transmission attempt, etc. of a user or requires the transmission of a corresponding response message, etc. when receiving a paging message from the E-UTRAN, for example.

In order for the UE in the idle state to set up the RRC connection with the eNB, the UE needs to perform an RRC connection procedure as described above. The RRC connection process basically includes a process for the UE to transmit an RRC connection request message to the eNB, a process for the eNB to transmit an RRC connection setup message to the UE, and a process for the UE to transmit an RRC connection setup complete message to the eNB. Such processes are more particularly described below with reference to FIG. 13.

1. If a UE in the idle state wants to set up an RRC connection for a reason, such as a call attempt, a data transmission attempt, or a response to the paging of an eNB, first, the UE transmits an RRC connection request message to the eNB.

2. When receiving the RRC connection request message from the UE, the eNB accepts the RRC connection request of the UE if radio resources are sufficient, and transmits an RRC connection setup message, that is, a response message, to the UE.

3. When receiving the RRC connection setup message, the UE transmits an RRC connection setup complete message to the eNB.

When the UE successfully transmits the RRC connection setup message, the UE sets up the RRC connection with the eNB and makes a transition to an RRC connection mode.

If new traffic occurs, in order for the UE in the idle state to make a transition to an activation state capable of traffic transmission/reception, a service request process is performed. In the state in which the UE has been registered with a network, but an S1 connection has been released due to traffic deactivation, and a radio resource has not been assigned, that is, if the UE is in an EMM registration state (EMM-Registered), but is in an ECM idle state (ECM-Idle), when traffic to be transmitted by the UE occurs or traffic to be transmitted from a network to the UE occurs, the UE requests service from the network. When a service request process is successfully terminated, the UE makes a transition to an ECM connected state (ECM-Connected), configures an ECM connection (RRC connection+S1 signaling connection) in the control plane and an E-RAB (DRB and S1 bearer) in the user plane, and transmits/receives the traffic. If the network wants to transmit the traffic to the UE in the ECM idle state (ECM-Idle), first, the network first notifies the UE that the traffic to be transmitted to the UE is present through a paging message so that the UE can make a service request.

LWA Architecture

Hereinafter, LWA architecture is described. The LWA is described in 3GPP TS36.300.

A LTE WiFi aggregation (LWA) is technology that provides a wider data transmission speed to a UE using LTE and WiFi by additionally connects a WiFi AP to an eNB.

If the LWA is used, a UE can perform communication using the following two methods.

SPLIT bearer: a method including both LTE and WiFi configurations in one DRB. Some of data may be transmitted through an LTE radio interval and some of the data may be transmitted through a WiFi radio interval depending on a radio environment, the amount of data, etc.

Switched bearer: this means a bearer configured for a UE and an eNB to exchange data of a specific data bearer through only WiFi. Accordingly, the switched bearer may be used when the importance of QoS guarantee is low, when it is insensitive to a QoS change, or in order to provide bearer service at a low price.

FIGS. 14(a) and 14(b) illustrate a flow of a (downlink/uplink) signal between a UE and a network node(s) in a conventional system.

In the case of downlink signal transfer, the P-GW sends, to the S-GW/eNB, a signal to be transmitted using the LTE technology, and sends, to a WiFi access point (AP), a signal to be transmitted using the WiFi technology (without the intervention of the S-GW and the eNB). A UE receives a signal for the UE using the LTE technology on one or more licensed bands or receives a signal for the UE using the WiFi technology on an unlicensed band.

In the case of uplink signal transfer, a signal using the LTE technology is transferred to the P-GW via the eNB and the S-GW on a licensed band. A signal using the WiFi technology is transferred to the P-GW via the AP (without the intervention of the eNB and the S-GW) on an unlicensed band.

FIGS. 15(a) and 15(b) illustrate a flow of a (downlink/uplink) signal between a UE and a network node(s) in an improved system to which the present disclosure is applied. In particular, FIG. 15(a) illustrates to describe a licensed assisted access (LLA) concept, and FIG. 15(b) illustrates to describe an LTE-WLAN aggregation (LWA) concept.

In a current WiFi system, an unlicensed band not dedicated to a specific operator is used for communication. If a given criterion, for example, technology that does not generate interference with a radio channel or minimizes interference is used on such an unlicensed band and if given output power or less is used, any radio technology may be used. Accordingly, there is a movement that technology used in a current cellular network is to be applied to an unlicensed band, which is called an LAA. As users who use mobile data are explosively increased compared to a frequency (i.e., licensed band(s)) owned by each radio communication service operator, the introduction of the LAA into an LTE system is considered to improve the satisfaction of users by providing service even in an unlicensed band. According to the LAA, the LTE radio frequency can be extended to a frequency band not specified by 3GPP, that is, an unlicensed band. A WLAN band may be a major application target of the LAA.

Referring to FIG. 15(a), if a band A, that is, a licensed band, and a band B, that is, an unlicensed band, are aggregated for a UE, an eNB may transmit a downlink signal toward a UE to the UE using the LTE technology on the band A, that is, a licensed band, or on the band B, that is, an unlicensed band. Likewise, if the band A, that is, a licensed band, and the band B, that is, an unlicensed band, are aggregated from the UE, an uplink signal transmitted from the UE to a network may be transmitted from the UE to the eNB (or the remote radio header (RRH)/remote radio unit (RRU) of the eNB) using the LTE technology on the band A, that is, a licensed band, or on the band B, that is, an unlicensed band.

Meanwhile, in the existing LTE system, although a plurality of frequency bands is aggregated for communication with a UE, uplink/downlink communication between a UE and a network node was performed using only the LTE technology on the plurality of frequency bands. In other words, a communication link which may be simultaneously used by a UE in different frequencies was only an LTE link. As another method for reducing congestion on licensed bands, to perform communication between a UE and a network node simultaneously using the LTE technology and the WiFi technology in different frequencies is considered. Such a technology is called LWA. According to the LWA, a WLAN radio spectrum and a WLAN AP are used for communication with a UE along with an LTE radio spectrum and an LTE node (e.g., eNB, RRH, and RRU).

Referring to FIG. 15(b), an eNB may directly transmit, to a UE and may transmit, to an AP, downlink data for a UE using the LTE technology on the band A, that is, a licensed band configured for the UE. The eNB may transmit LTE data to the AP and may control the AP. The AP may transmit the downlink data for the UE to the UE using the WiFi technology on the band B, that is, an unlicensed band, under the control of the eNB. Likewise, if the band A, that is, a licensed band, and the band B, that is, an unlicensed band, are configured for the UE, the UE may directly transmit uplink data to the eNB using the LTE technology on the band A, and may transmit the uplink data to the AP using the WiFi technology on the band B. The AP transfers the uplink data from the UE to the eNB that controls the AP.

PS_data_Off

A PS_data_Off function refers to a function for maintaining essential communication service even if a UE places its mobile-data switch in an off state.

When considering based on conventional circuit-switched (CS) service, a UE always operates in the state in which essential communication service, such as a voice call and SMS, can be used unless a user powers off the UE or configures the UE in an airplane ode.

However, with the spread of smartphones, a UE can support even various services based on the Internet in addition to essential communication service such as a simple voice call and SMS. In particular, in order to use such various services based on the Internet, the UE needs to have a connection to the Internet supported. In this case, methods of allowing the UE to be connected to the Internet are various. For example, a user may use WiFi, and may use mobile data communication using a cellular network, by using a communication company to which a UE has subscribed.

As the communication environment is changed into packet-switched (PS) service based on the Internet as described above, the existing voice call service is also changed from the CS base to the PS base. In particular, as a voice call is provided on an Internet-based multimedia service (IMS) system that provides multimedia service based on the IP protocol, voice data transmission and reception using a wider wide bandwidth is made possible, and various services in which photo/text/moving images converge on a voice call are also made possible because the PS service is based on the IP.

Accordingly, it is expected that all services provided based on the CS base will be provided based on the PS base. Actually, in Korea, a voice call is provided based on the PS base under the name called VoLTE, and some operators do not provide a voice call based on CS.

In such a situation, if a user changes the mobile data switch of the UE to an off state, all Internet data of the UE is blocked, and thus the data of the aforementioned VoLTE service may also be blocked. As a result, this means that the UE is in the state in which it cannot provide even the most basic voice call.

In an era in which overseas movements are many today, if a user visits a foreign country and if a communication operator which may be accessed overseas provides only PS service without supporting CS service, a problem may be severe. That is, the user will place the mobile data switch in the off state in order to reduce a data roaming cost. In this case, the PS service also becomes the off state, and an Internet voice call and SMS are blocked.

In order to solve such a problem, in 3GPP, a PS_data_off function was added as a Rel-14 standard. In this case, an HPLMN notifies the UE of information on service under the name of data_off_exempt_service. Although a user places the mobile data switch in the off state, Internet data corresponding to the data_off_exempt_service may be still transmitted and received through the PS_data_off function. Accordingly, although the user places the mobile data switch in the off state, essential services designated by the HPLMN can be continuously provided to the UE.

As described above, the PS_data_off function is a function for enabling a user to perform whether to block data, and notifying a network of data blocking and simultaneously preventing data of service exempted from the data blocking from being influenced. In particular, in order to not transmit and receive data exceeding the amount of data predetermined by a user or to prevent unnecessary charging from occurring, to change the mobile data switch may be said to be a necessary function from a user experience aspect However, from a standpoint of an operator, in the cases of a frequency assigned thereto, the operator pays a lot of money in order to obtain the frequency, but does not pay money in order to have a frequency region assigned thereto with respect to an unlicensed band in which WiFi, etc. is operated. Accordingly, when providing service to customers, the operator may operate different systems for charging when providing service to a user in the assigned frequency (hereinafter indicated as a licensed band or an LB or a licensed band) and for charging when providing service to a user when the operator uses an unlicensed band.

If such information is provided to a user, the user may configure that data is blocked from being transmitted over an LTE network and data is not blocked from being transmitted over a WiFi network. However, in a current PS_data_off structure, a UE is uniformly made to block data transmission and reception over a 3GPP radio access network regardless of a radio access technology which may be used by the UE. For example, a UE is uniformly blocked if WiFi/ap/ssid is directly connected to a 3GPP radio access network. In this case, there is a problem in that various options and configurations of a user are limited as described above.

Accordingly, the present disclosure proposes that a UE determines whether the use of secondary access has been blocked based on a user configuration or selection and transmits corresponding information to a network. Additionally, the network determines whether the secondary access is used based on information received from the UE, additionally determines whether additional data blocking based on PS_DATA_off is necessary, and blocks data if the additional data blocking is necessary.

Preferably, when notifying the network of the activation or deactivation of PS_DATA_OFF, the UE additionally notifies the network of information on a configuration state of secondary access configured by the user. For example, the configuration state of the secondary access means information on whether the user of LWA has been configured in the UE or WiFi controlled by 3GPP radio access control, such as LTE or NR, is used/blocked, whether WiFi controlled by a 3GPP radio access technology, such as or LTE or NR, is used/blocked, or whether a 3GPP radio access technology, such as LTE or NR operated in an unlicensed band, is used/blocked.

Preferably, the UE notifies the network of information related to the configuration state of the secondary access, which is included in an attach request message or a PDN connectivity request message of the UE, a bearer resource modification request message or a message having an equivalent character. For example, the information may be included in a protocol configuration option (PCO) field of such a message.

The network may perform the following operation, for example, based on the information on the configuration state of the secondary access and information the PS_DATA_off switch, which are transmitted by the UE. To this end, the information on the secondary access configuration state of the UE may be transmitted along with the PS_DATA_off configuration information.

PS_DATA_off is active, and the configuration of the secondary access is permitted: In this case, the network determines that the UE requests only data transmission using only WiFi using LWA, etc. or data transmission using LTE/NR in an unlicensed band. Accordingly, for example, the network may update configuration information of the network including an eNB, and may instruct the UE to perform only the transmission of all data using only WiFi using LWA or the transmission of all the data using LTE/NR in an unlicensed band. Or the network may update configuration information of the network including an eNB, and may instruct the UE to transmit only data not corresponding to data_off_exempt_service using only WiFi using LWA or to transmit the data using LTE/NR in an unlicensed band, and may simultaneously instruct the UE to transmit data, corresponding to data_off_exempt_service, u sing only a 3GPP radio access technology, such as LTE or NR. The UE may also take an operation similar to that of the network on data in an opposite direction.

PS_DATA_off is active, and the configuration of the secondary access is blocked: In this case, the network determines that the UE blocks all data, not corresponding to data_off_exempt_service, from being transmitted over a 3GPP access network. Accordingly, in the case of data in a downlink direction, the network may instruct the UE to transmit only data, corresponding to data_off_exempt_service, using a 3GPP radio access technology, such as LTE or NR, by transmitting the data to a 3GPP access network, and other data is blocked. The UE may also take an operation similar to that of the network on data in an opposite direction.

PS_DATA_off is inactive, and the configuration of the secondary access is blocked: In this case, the network determines that the UE does not want data transmission using only WiFi using LWA or data transmission using LTE/NR in an unlicensed band. Accordingly, for example, the network may update configuration information of the network including the eNB, and may instruct the UE to transmit all data using only a 3GPP radio access technology, such as LTE or NR. The UE may also take an operation similar to that of the network on data in an opposite direction.

PS_DATA_off is inactive, and the configuration of the secondary access is also permitted: In this case, the network may update configuration information of the network including the eNB so that all data is transmitted to the UE. The network may instruct the UE to perform data transmission using a 3GPP radio access technology, such as LTE/NR, including data transmission using WiFi using LWA or using LTE/NR in an unlicensed band based on the scheduling of a radio network. The UE may also take an operation similar to that of the network on data in an opposite direction.

As described above, in the case of a method, such as LWA in which both LTE/NR and WiFi are used, there is a need for hardware for processing a 3GPP radio access technology, such as LTE/NR, and hardware for processing a WiFi signal. However, in most cases, users directly configure WiFi. For example, if a user enters a café or enters a company or stays at home, the user directly selects WiFi AP to be accessed and additionally accesses the WiFi regardless of whether a 3GPP radio access technology is used. Accordingly, if a method, such as LWA, is to be used smoothly without interruption, a UE requires WiFi hardware for LWA and WiFi hardware which may be randomly used by a user. However, this requires additional hardware for the UE and is not a preferred situation when the space on which new hardware will be mounted is insufficient in terms of the structure of the UE.

Accordingly, the present disclosure uses a piece of WiFi hardware for a 3GPP-based technology, such as LWA, and for other common WiFi AP access situations. To this end, the present disclosure proposes that if a user directly changes its own WiFi configuration, a UE notifies a network of the change.

Preferably, if the user of a UE changes an AP to be accessed by randomly changing a WiFi configuration, the UE transmits, to a network, WiFi environment information related to the change, for example, information on a changed AP or a service set identifier (SSID), or information indicating that a function such as LWA cannot be used, or information indicating that WiFi managed in 3GPP cannot be used, or information indicating that 3GPP access through communication using an unlicensed band is impossible, or information on its similar character. The network updates communication environment configuration information of the UE or capability information of the UE managed by the network based on the information.

In the process, the secondary access means that additional access is provided by a combination of another RAT or node or band, in addition to a cell, that is, the center of control by the UE through an RRC connection. For example, after an RRC connection is established in a cell in which LTE is provided, when a UE additionally has an additional connection assigned thereto through WiFi/NR or an unlicensed band, such an addition may be called secondary access. In this case, a network may control the utilization of the secondary access based on a load, scheduling, etc. of the network. For example, the network may transmit and receive data through only the secondary access, and may use a connected LTE cell for only control/signaling.

If a network and a UE are already in the RRC connected state and the UE is using the LWA function, when the UE directly notifies the network of a change in information related to WiFi, for example, when the use of WiFi ap related to LWA is difficult to use due to the use of WiFi ap directly configured by a user, the network may release the LWA function in a radio access network, and may not configure the LWA function in the radio access network until the UE notifies the network of new information.

If the network and the UE are in the RRC connected state and the LWA function is not used, when the UE notifies the network of a change in information related to WiFi, for example, when the use of WiFi ap related to LWA is difficult to use due to the use of WiFi ap directly configured by a user, the network updates capability information of the UE stored in the network, and may not configure the LWA function in a radio access network until the UE notifies the network of new information in the future.

If the network and the UE are not in the RRC connected state, when the UE notifies the network of a change in information related to WiFi, for example, when the use of WiFi ap related to LWA is difficult to use due to the use of WiFi ap directly configured by a user, the network updates capability information of the UE stored in the network, and may not configure the LWA function in a radio access network until the UE notifies the network of new information.

Additionally, in the process, the network may store the updated information of the UE in HSS or user data management (UDM) in which the capability, etc. of the UE is stored.

If the user directly configures and uses a WiFi ap, this may be temporary. For example, if the user directly changes a WiFi configuration only at his or her home and configures the WiFi configuration at an app installed at the home, when the user moves from the home to another place, the user may use the LWA function through an app directly installed by an operator or an app associated with LWA from that time. Accordingly, in the process, the UE may temporarily request to stop the use of the LWA function or may temporarily notify a network that the WiFi function cannot be used.

Furthermore, if the situation is released, the UE may notify the network that opposite information, that is, the LWA function, can be used again or the WiFi function can be used.

FIG. 16 is an embodiment of a user equipment to which the present disclosure may be applied.

1. A UE notifies a network of its own capability configuration information. Such capability configuration information may include the aforementioned secondary access configuration information.

2. The network triggers a communication environment configuration based on the received capability configuration information. The UE applies the communication environment configuration and transmits and receives data to and from the network through the communication environment configuration. For example, in the case of a UE for which LWA is permitted, a network may transmit and receive data to and from the UE using the LWA function.

3. If a secondary access connection configuration of the UE is changed, the UE transmits secondary access connection configuration information to the network.

4. The network triggers a communication environment reconfiguration based on the received secondary access connection configuration information. The UE applies the communication environment reconfiguration, and may transmit and receive data to and from the UE through the reconfigured communication environment.

FIG. 17 is an embodiment of a user equipment to which the present disclosure may be applied.

1. A UE notifies of a node of a network of its own capability configuration information related to secondary access configuration information. Such capability information may include information indicating whether the UE supports LWA and WiFi is available. The node of the network may be an MME. The MME may additionally notify an HSS, a P-GW, and a S-GW of the capability configuration information. Accordingly, the capability configuration information of the UE may be stored and managed in the corresponding network.

2. When data to be transmitted and received to and from the UE occurs, a communication (connection) environment of the network is configured. For example, if both LTE and WiFi are available, the MME may establish a connection so that a communication environment using both LTE and WiFi is possible based on the capability information at step 1.

3. The UE and the network perform data transmission and reception through the configured communication environment. In the case of a UE for which the LWA function is permitted, the network may activate LWA for communication with the UE.

4. If a user directly configures a WiFi environment, for example, if the UE is connected to an AP not managed in a 3GPP system or the UE is connected to an AP not designated in a 3GPP system, a WiFi connection configuration of the UE may be changed.

5. The UE notifies the network of such WiFi connection configuration information.

6. The network reconfigures a communication environment for the UE based on the connection configuration information at step 5. For example, the network determines to no longer use the LWA function.

7. The UE and the network perform data transmission and reception through the reconfigured communication environment. If the network deactivates the LWA function, the UE no longer uses a WLAN terminal (WT) for which LWA is supported.

8. After some time, if the user recognizes that the use of the AP directly designated by the user is no longer user, the user may stop the use of the corresponding WiFi.

9. The UE transfers such WiFi connection configuration information to the network.

10. The network recognizes that WiFi in the UE may be controlled again based on the connection configuration information at step 9, and reconfigures the communication environment so that the LWA function is used.

11. The UE and the network perform data transmission and reception through the reconfigured communication environment. If the user cannot use the designated WLAN AP, the UE supporting LWA may transmit and receive data to and from the network using LWA again.

In the embodiment, LWA has been taken as an example, but this may be identically applied to technology having an object similar to that of LWA using a WiFi connection technology controlled by a 3GPP system.

As another method, if a network provides service to a UE by controlling a function related to WiFi, such as LWA, or provides service to the UE using an unlicensed band, the network may selectively instruct the UE to make a report in the following cases. When a corresponding condition is satisfied, the UE may notify the network of related contents.

In using a function, such as LWA, the network may notify the UE of a candidate AP list, for example, service set identifier (SSID) information related to the function or AP candidate information. If another AP other than such an AP is accessed due to a user configuration in the UE or another reason, the network notifies a base station of the user configuration.

Or when the user permits or does not permit a WiFi technology controlled by 3GPP, the network is notified of the permission or non-permission. For example, WiFi technologies controlled by 3GPP include LWA, LTE/WLAN radio level integration using IPsec tunnel (LWIP), etc. If the user turns on or off such a function, the network is notified of the turn-on or off.

Or whenever the user directly turns off or on WiFi or the user directly selects an AP/SSID, the network is notified of the turn-off or on. For example, the network is aware that the UE supports the LWA function, and may determine that the user does not want the support of a function, such as LWA, if the user directly turns on the WiFi function.

An EPS system has been chiefly described using an eNB, for convenience of description, but the eNB may be substituted with a gNB, the mobility management (MM) function of the MME may be substituted with the AMF, the SM function of the S/P-GW may be substituted with the SMF, the user plane related function of the S/P-GW may be substituted with the UPF using the 5G system.

In the above description, the present disclosure has been described based on an EPS, but corresponding contents may be supported through a similar operation using a process/message/information having a similar object even in a 5G system.

General apparatus to which the present disclosure may be applied

Referring to FIG. 18, a network node device X200 according to a proposed embodiment may include a transceiver X210, a processor X220, and a memory X230. The transceiver X210 is also referred to as a radio frequency (RF) unit. The transceiver X210 may be configured to transmit various signals, data and information to an external apparatus and to receive various signals, data and information from the external apparatus. The network node device X200 may be connected to the external apparatus through wires and/or wirelessly. The transceiver X210 may be implemented to be separated into a transmission unit and a reception unit. The processor X220 may control an overall operation of the network node device X200, and may be configured to perform an operation processing function on information to be transmitted and received to and from the external apparatus by the network node device X200. Furthermore, the processor X220 may be configured to perform a network node operation proposed in the present disclosure. The processor X220 may control the transceiver X210 to transmit data or a message to a UE or another network node according to the proposal of the present disclosure. The memory X230 may store the operation-processed information, etc. for a given time, and may be substituted with an element, such as a buffer.

Furthermore, such detailed configurations of a UE device X100 and network device X200 may be implemented so that the contents described in the aforementioned various embodiments of the present disclosure are independently are applied or two or more embodiments are simultaneously applied, and redundant contents are omitted for clarity.

FIG. 19 illustrates is a block diagram of a communication apparatus according to an embodiment of the present disclosure.

In particular, FIG. 19 is a diagram more specifically illustrating the UE of FIG. 18.

Referring to FIG. 19, the UE may include a processor (or digital signal processor (DSP)) 3310, an RF module (or RF unit) 3335, a power management module 3305, an antenna 3340, a battery 3355, a display 3315, a keypad 3320, a memory 3330, a subscriber identification module (SIM) card 3325 (this element is optional), a speaker 3345, and a microphone 3350. Furthermore, the UE may include a single antenna or multiple antennas.

The processor 3310 implements the proposed functions, processes and/or methods. The layers of a radio interface protocol may be implemented by the processor 3310.

The memory 3330 is connected to the processor 3310, and stores information related to the operation of the processor 3310. The memory 3330 may be positioned inside or outside the processor 3310 and may be connected to the processor 3310 by various well-known means.

A user inputs command information, such as a telephone number, by pressing (or touching) a button of the keypad 3320 or through voice activation using the microphone 3350, for example. The processor 3310 receives such command information and performs processing so that a proper function, such as making a phone call to the telephone number, is performed. Operational data may be extracted from the SIM card 3325 or the memory 3330. Furthermore, the processor 3310 may display command information or driving information on the display 3315 for user recognition or convenience.

The RF module 3335 is connected to the processor 3310 and transmits and/or receives RF signals. The processor 3310 delivers command information to the RF module 3335 so that the RF module 3335 transmits a radio signal that forms voice communication data, for example, in order to initiate communication. The RF module 3335 includes a receiver and a transmitter in order to receive and transmit radio signals. The antenna 3340 functions to transmit and receive radio signals. When a radio signal is received, the RF module 3335 delivers the radio signal so that it is processed by the processor 3310, and may convert the signal into a baseband. The processed signal may be converted into audible or readable information output through the speaker 3345.

In the present disclosure, the wireless device may be a base station, a network node, a transmission terminal, a reception terminal, a radio device, a wireless communication device, a vehicle, a vehicle on which a self-driving function is mounted, a drone (unmanned aerial vehicle (UAV)), an artificial intelligence (AI) module, a robot, an augmented reality (AR) device, a virtual reality (VR) device, an MTC device, an IoT device, a medical device, a FinTech device (or financial device), a security device, a climate/environment device, or a device related to the fourth industrial revolution field or 5G service in addition to the devices. For example, the drone may be a flight vehicle that flies by a wireless control signal without a person being on the flight vehicle. For example, the MTC device and the IoT device are devices that do not require a person's direct intervention or manipulation, and may include a smart meter, a vending machine, a thermometer, a smart bulb, a door lock or a variety of sensors. For example, the medical device may be a device used for the purpose of diagnosing, treating, reducing, handling or preventing a disease or a device used for the purpose of testing, substituting or modifying a structure or function, and may include equipment for medical treatment, a device for operation, a device for (external) diagnosis, a hearing aid or a device for a surgical procedure. For example, the security device is a device installed to prevent a possible danger and to maintain safety, and may be a camera, CCTV, or a blackbox. For example, the FinTech device is a device capable of providing financial services, such as mobile payment, and may include a payment device or point of sales (POS). For example, the climate/environment device may mean a device for monitoring or predicting a climate/environment.

The mobile terminal described in the present disclosure may include a mobile phone, a smart phone, a laptop computer, a terminal for digital broadcasting, a personal digital assistants (PDA), a portable multimedia player (PMP), a navigator, a slate PC, a tablet PC, an ultrabook, a wearable device (e.g., a watch type terminal (smartwatch), a glass type terminal (smart glass), a head mounted display (HMD)), and so on. Furthermore, the mobile terminal may be used to control at least one device in an Internet of Things (IoT) environment or a smart greenhouse.

However, a person skilled in the art will easily understand that the configuration according to the embodiments described in the present disclosure may be applied to stationary devices, such as digital TV, a desktop computer, and digital signage except a case where the configuration is applicable to mobile terminal.

The embodiments related to a control method which may be implemented in the mobile terminal configured as described above have been described with reference to the accompanying drawings. It is evident to those skilled in the art that the present disclosure may be materialized in another specific form without departing from the spirit and essential characteristics of the present disclosure.

The aforementioned embodiments of the present disclosure may be implemented through various means. For example, the embodiments of the present disclosure may be implemented by hardware, firmware or software, or a combination thereof.

In the case of an implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of an implementation by firmware or software, a method according to the embodiments of the present disclosure may be implemented in the form of a device, a procedure, or a function that performs the aforementioned functions or operations. A software code may be stored in the memory unit and executed by the processor. The memory unit may be positioned inside or outside the processor and may transmit and receive data to/from the processor by already various means The present disclosure may be implemented as a computer-readable code in a medium in which a program is written. The computer-readable medium includes all types of recording devices in which data readable by a computer system is stored. Examples of the computer-readable medium include a hard disk drive (HDD), a solid state disk (SSD), a silicon disk drive (SDD), a ROM, a RAM, a CD-ROM, magnetic tapes, floppy disks, and optical data storages, and also include that the computer-readable medium is implemented in the form of carrier waves (e.g., transmission through the Internet). Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

The aforementioned communication method may be applied to various wireless communication systems including IEEE 802.16x and 802.11x systems in addition to a 3GPP system. Furthermore, the proposed method may also be applied to an mmWave communication system using an ultra-high frequency band.

The invention claimed is:

1. A method of controlling, by a user equipment (UE), a data transmission state in a wireless communication system, the method comprising:
    transmitting, to a node supporting a first radio access technology (RAT), capacity information related to an aggregation of the first RAT and a second RAT;
    applying a communication configuration received from the node to a first access node (AP) controlled by the first RAT;
    transmitting, to the node, status information related to the aggregation; and
    applying a communication reconfiguration related to the aggregation received from the node,
    wherein the capacity information related to the aggregation includes information of capacity related to the aggregation,
    wherein, in case that the status information is for that a connection for the second RAT of the UE is changed from the first AP to a second AP not controlled by the first RAT, the communication reconfiguration is for a disconnection with the second AP,
    wherein the first AP and the second AP support the second RAT.

2. The method of claim 1,
    wherein when the capacity information related to the aggregation is for that an access permission of the second RAT for the UE, the communication configuration is for activating the aggregation between the node and the UE.

3. The method of claim 1,
    wherein, in case that the status information is for that the connection for the second RAT of the UE has been changed, the communication reconfiguration is for deactivating the aggregation between the node and the UE.

4. The method of claim 1,
    wherein, in case that the communication reconfiguration is for the disconnection with the second AP, the communication reconfiguration is for a new connection with a third AP controlled by the first RAT,
    wherein the third AP supports the second RAT.

5. The method of claim 1,
    wherein the node is a mobility management entity (MME) or a node associated with a mobility of the UE or session management.

6. The method of claim 1, further comprising:
    receiving, from the node, a list of connectable APs supporting the second RAT; and
    transmitting, to the node, information on the second AP in case that the UE is connected to the second AP not included in the list.

7. The method of claim 1, further comprising:
    transmitting, to the node, aggregation configuration in case that the aggregation configuration of the UE is configured as deactivation.

8. The method of claim 1,
    wherein the capacity information related to the aggregation is transmitted along with data blocking function (PS_DATA_OFF) configuration information.

9. A method of controlling, by a node supporting a first radio access technology (RAT), a data transmission state in a wireless communication system, the method comprising:
    receiving, from a user equipment (UE), capacity information related to an aggregation of the first RAT and a second RAT;
    transmitting, to the UE, a communication configuration related to the aggregation based on the capacity information;
    receiving, from the UE, status information related to the aggregation; and
    transmitting, to the UE, a communication reconfiguration for to a first access node (AP) controlled by the first RAT related to the aggregation based on the status information,
    wherein the capacity information related to the aggregation includes capacity related to the aggregation,
    wherein, in case that the status information is for that a connection for the second RAT of the UE is changed from the first AP to a second AP not controlled by the first RAT, the communication reconfiguration is for a disconnection with the second AP and a new connection with a third AP controlled by the first RAT,
    wherein the first AP, the second AP and the third AP support the second RAT.

10. The method of claim 9, further comprising:
    delivering the capacity information to a second node supporting the first RAT,
    wherein the second node includes a home subscriber server (HSS) or a PDN gateway (P-GW) or a serving gateway (S-GW).

11. The method of claim 9,
    wherein, in case that the capacity information related to the aggregation is for that an access permission of the second RAT for the UE, the communication configuration is for activating the aggregation between the node and the UE.

12. The method of claim 9,
wherein, in case that the status information is for that the connection for the second RAT of the UE has been changed, the communication reconfiguration is for deactivating the aggregation between the node and the UE.

13. The method of claim 9,
wherein, in case that the communication reconfiguration is for the disconnection between the UE and the second AP, the communication reconfiguration is for a new connection with a third AP controlled by the first RAT,
wherein the third AP supports the second RAT.

14. The method of claim 9,
wherein the first node is a mobility management entity (MME) or a node associated with a mobility of the UE or session management.

15. The method of claim 9, further comprising:
transmitting, to the UE, a list of connectable APs supporting the second RAT to which the UE is capable of being connected; and
in case that the UE is connected to the second AP not included in the list, receiving information on the second AP.

16. The method of claim 9, further comprising:
receiving, from the UE, aggregation configuration in case that the aggregation configuration of the UE is configured as deactivation.

17. The method of claim 9,
wherein the capacity information related to the aggregation is received along with data blocking function (PS_DATA_OFF) configuration information.

18. A user equipment (UE) controlling a data transmission state in a wireless communication system, comprising:
a communication module;
a display;
a memory; and
a processor controlling the communication module, the display, and the memory,
wherein the processor is configured to:
transmit, to a node supporting a first radio access technology (RAT), capacity information related to an aggregation of the first RAT and a second RAT;
apply a communication configuration related to the aggregation received from the node to a first access node (AP) controlled by the first RAT;
transmit, to the node, status information related to the aggregation through the communication module; and
apply a communication reconfiguration related to the aggregation received from the node,
wherein the capacity information related to the aggregation includes information of capacity related to the aggregation,
wherein, in case that the status information is for that a connection for the second RAT of the UE is changed from the first AP to a second AP not controlled by the first RAT, the communication reconfiguration is for a disconnection with the second AP,
wherein the first AP and the second AP support the second RAT.

* * * * *